United States Patent
Kobayashi et al.

(10) Patent No.: US 7,428,217 B2
(45) Date of Patent: Sep. 23, 2008

(54) MOBILE COMMUNICATION DEVICE, MOBILE ROUTER, AND MOBILE COMMUNICATION SYSTEM

(75) Inventors: Hirokazu Kobayashi, Kawasaki (JP);
Taisuke Matsumoto, Yokohama (JP);
Toyoki Kawahara, Kawasaki (JP);
Makoto Funabiki, Kawasaki (JP);
Shinkichi Ikeda, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 742 days.

(21) Appl. No.: 10/511,563

(22) PCT Filed: Oct. 9, 2003

(86) PCT No.: PCT/JP03/12950

§ 371 (c)(1),
(2), (4) Date: Oct. 15, 2004

(87) PCT Pub. No.: WO2004/034724

PCT Pub. Date: Apr. 22, 2004

(65) Prior Publication Data

US 2005/0181792 A1    Aug. 18, 2005

(30) Foreign Application Priority Data

Oct. 10, 2002  (JP) .............................. 2002-297318
Oct. 6, 2003   (JP) .............................. 2003-346836

(51) Int. Cl.
*H04L 12/28*  (2006.01)
*H04Q 7/00*   (2006.01)
*H04Q 7/20*   (2006.01)

(52) U.S. Cl. .................. 370/235; 370/328; 370/395.21; 455/435.3; 455/452.2

(58) Field of Classification Search ......... 370/230–238, 370/252, 328–338; 455/432.1–466
See application file for complete search history.

(56) References Cited

U.S. PATENT DOCUMENTS 5,946,634 A  *  8/1999  Korpela .................... 455/552.1

(Continued)

FOREIGN PATENT DOCUMENTS

JP          09-172451 A       6/1997

(Continued)

OTHER PUBLICATIONS

International Search Report for PCT/JP2003/012950, dated Jan. 27, 2004.

*Primary Examiner*—Chi H. Pham
*Assistant Examiner*—Tri H. Phan
(74) *Attorney, Agent, or Firm*—RatnerPrestia

(57) ABSTRACT

Provided are a service-type recording section for recording a characteristic of a service to be utilized by the mobile communication device and an interface recording section for recording an externally-connecting interface type of within a network and a characteristic thereof. The interface decision section selects at least one or more of interfaces satisfying a service request and notifies it to a mobile router possessing an externally-connecting interface. Due to this, in case there is a link status change in the external interface of the mobile router, the mobile communication device is allowed to swiftly switch the external interface and continue communication. Moreover, congestion can be avoided from occurring in communication between the mobile communication device and the mobile router during switchover.

17 Claims, 30 Drawing Sheets

U.S. PATENT DOCUMENTS

| | | | |
|---|---|---|---|
| 6,456,858 B1 * | 9/2002 | Streter | 455/552.1 |
| 6,961,573 B1 * | 11/2005 | Moon et al. | 455/445 |
| 7,068,624 B1 * | 6/2006 | Dantu et al. | 370/331 |
| 7,075,908 B2 * | 7/2006 | Noguchi et al. | 370/329 |

FOREIGN PATENT DOCUMENTS

| | | |
|---|---|---|
| JP | 2000-013823 A | 1/2000 |
| JP | 2000-244601 A | 9/2000 |
| JP | 2002-507343 A | 3/2002 |
| JP | 2003-514442 A | 4/2003 |
| JP | 2003-283546 A | 10/2003 |
| JP | 2003-319461 A | 11/2003 |
| WO | WO 96/28947 A1 * | 9/1996 |
| WO | WO 01/35585 | 5/2001 |

* cited by examiner

| FLAG | SERVICE | SPEED | VOICE | MOVING IMAGE | AREA | PRIVACY | PRICE |
|---|---|---|---|---|---|---|---|
| VALID | VOICE COMMUN-ICATION | B | AA | B | AA | AA | A |
| VALID | INTERNET | AA | B | B | A | B | AA |
| VALID | MOVING -IMAGE COMMUN-ICATION | AA | B | AA | A | AA | A |

Figure 4

| | | | | MOVING IMAGE | | | |
|---|---|---|---|---|---|---|---|
| 301 | 302 | 303 | 304 | 305 | 306 | 307 | 308 |
| FLAG | SERVICE | SPEED | VOICE | | AREA | PRIVACY | PRICE |
| INVALID | VOICE COMMUN-ICATION | B | AA | B | AA | AA | A |
| VALID | INTERNET | AA | B | B | A | B | AA |
| VALID | MOVING-IMAGE COMMUN-ICATION | AA | B | AA | A | AA | A |

| 501 | 502 | 503 | 504 |
|---|---|---|---|
| COMMUNICATION DEVICE IDENTIFIER | INTERFACE TYPE (1) | INTERFACE TYPE (2) | INTERFACE TYPE (3) |
| | IEEE802.11a | W-CDMA | PDC |

3ffe:501::100:204:b1ff:fe98:3e9

| TYPE | SPEED | VOICE | MOVING IMAGE | AREA | PRIVACY | PRICE |
|---|---|---|---|---|---|---|
| CDMA2000 | 2 | 5 | 3 | 3 | 5 | 2 |
| W-CDMA | 3 | 5 | 4 | 2 | 5 | 1 |
| IEEE802.11a | 5 | 3 | 2 | 2 | 3 | 5 |
| IEEE802.11b | 4 | 1 | 1 | 2 | 3 | 5 |
| IEEE802.11e | 5 | 4 | 5 | 1 | 3 | 5 |
| PHS | 2 | 5 | 2 | 3 | 5 | 3 |
| PDC | 1 | 5 | 1 | 5 | 5 | 3 |

| INTERFACE POSSESSED (801) | INTERFACE ID (802) | LINK STATUS (803) |
|---|---|---|
| IEEE802.11a | 3ffe:501:27:2210:33b7:25ff:fe44:3e77 | Connected |
| W-CDMA | 3ffe:501:27:22:ddb5:acff:fe25:3382 | Connected |
| PDC | 3ffe:501:27:dbe1:290:31ff:fe88:6621 | Connected |

| MOBILE COMMUNICATION DEVICE IDENTIFIER (901) | INTERFACE TYPE (902) |
|---|---|
| 3ffe:501::100:3226:bdff:fe20:667d | W-CDMA |

| MOBILE COMMUNICATION DEVICE | INTERFACE TYPE |
|---|---|
| 3ffe:501::100:3226:bdff:fe20:667d | W-CDMA |
| | IEEE802.11a |

| MOBILE COMMUNICATION DEVICE IDENTIFIER | INTERFACE TYPE | PRIORITY |
|---|---|---|
| 3ffe:501::100:3226:bdff:fe20:667d | W-CDMA | 1 |
|  | IEEE802.11a | 2 |

| Mobile Router Identifier | Interface Type | Link Status | Priority |
|---|---|---|---|
| 3ffe:501::100:204:b1ff:fe98:3e9 | IEEE802.11a | Connected | 2 |
| | W-CDMA | Connected | 1 |
| | PDC | Connected | 3 |

3ffe:501:5:187:104:eeff:fe31:7729
3ffe:501:221:10:312:26ff:fe14:2805

| MOBILE COMMUNICATION DEVICE IDENTIFIER | MOBILE ROUTER IDENTIFIER | INTERFACE TYPE | LINK STATUS | PRIORITY |
|---|---|---|---|---|
| 3ffe:501::100:3226: bdff:fe20:667d | 3ffe:501:: 100:204:b1ff: fe98:3e9 | W-CDMA | CONN-ECTED | 1 |
| | 3ffe:501: 221:10:312: 26ff:fe14: 2805 | IEEE802.11a | CONN-ECTED | 2 |

| INTERFACE TYPE | LINK STATUS |
|---|---|
| W-CDMA | CONNECTED |
| IEEE802.11a | CONNECTED |

MOBILE COMMUNICATION DEVICE, MOBILE ROUTER, AND MOBILE COMMUNICATION SYSTEM

This Application is a U.S. national phase application of PCT international application PCT/JP2003/012950.

TECHNICAL FIELD

The present invention relates to a mobile router for realizing network-based movement and a mobile communication device accommodated in the mobile router, and more particularly to a mobile communication device, mobile router and mobile communication system using an external interface optimal for connection with a network in accordance with the information to be handled by the mobile communication device.

BACKGROUND ART

Recently, there is a growing spread of personal network appliances along with the development of cellular telephony networks and wireless LANs. In such a situation, considerations have being made on the ubiquitous network that networks everything at the around in order to realize network access at any time and everywhere. For example, it is described in the document of a report "Study Group on the Future Overview of Ubiquitous Network Technology"—toward realizing a network with anything at everywhere, Jun. 11 2002, Information & Communications Policy Bureau of Ministry of General Affairs, Press Release, the Internet <URL: http://www.soumu.go.jp/s-news/2002/020611#4.html>. Conventionally, various mobile communication systems have been proposed in order to realize such a ubiquitous network.

FIG. 41 is a diagram showing a configuration of a mobile communication system described in JP-A-2000-13823.

In FIG. 41, a mobile communication unit 4101 is allowed to connect with a line control 4102a through a wireless base station 4103, to thereby obtain information on the type of the Internet 4104, a home intranet 4105, a public-switched telephone network (PSTN), an ISDN and a PHS 4106 as an external network usable from the line control 3102a. The mobile communication unit 4101 selects an optimal route on the basis of the information and makes a connection request to the line control 4102a and communicates with an external network selected. When the mobile communication unit 4101 moves and the communication zone is changed, the mobile communication unit 4101 makes notification to a new one of line control 4102b and selects an external network in the similar manner.

Meanwhile, FIG. 42 is a figure showing a configuration of a mobile communication system described in JP-T-2003-514442.

In FIG. 42, a mobile communication device 4202 is allowed to selectively access a network 4203 through one or more access-network terminal device 4201. An access-network terminal device 4202 is decided on the basis of a comparison between a capability of the access-network terminal device 4202 and a preferable capability. During communication with the network 4203, the mobile communication device 4202 continuously detects whether or not a new access-network terminal device 4201 can be utilized and compares the capability thereof with the access-network terminal device 4202 currently in connection. In a case the new one is more preferable, switchover is made to it.

However, in the mobile communication system described in JP-T-2000-13823, the mobile communication unit 4101 notifies an attribute from the mobile communication unit to the line control 4102. Otherwise, unless there is an inquiry, the information about the external network cannot be newly obtained, making it difficult to swiftly cope with a change in usability situation of the external network.

Meanwhile, in the mobile communication system described in JP-T-2003-514442, the mobile communication unit 4202 periodically searches for another available mobile routers 4201 in order to use the optimal one of mobile routers 4201 even after connection. In a case there comes a suitable one, connection is reset to that mobile router 4201. Consequently, because the mobile communication unit 4202 regularly searches for an optimal one of mobile router 4201, there is a heavy burden on the mobile communication unit 4202. Furthermore, there is a problem of frequent exchange of control signals in order to acquire the information of the mobile router 4201.

DISCLOSURE OF THE INVENTION

The present invention has been made in order to solve the above problem in the prior art, and it is an object thereof to provide a mobile communication device, mobile router and mobile communication system that, even when there is a link status change in an external interface of a mobile router, a mobile communication device swiftly switches the external interface thereby continuing communication and wherein congestion does not occur in communication between the mobile communication device and the mobile router.

The mobile communication system of the present invention selects an access media to be used according to the information the mobile communication device is to handle and notifies the mobile router of the information thereby limiting the medias usable for the mobile router to connect between the mobile communication device and the external network and allowing for selection therefrom.

This makes it possible to select an optimal access media for the information to be handled even in such a situation that the access media must be switched in order to continue communication.

A mobile communication device according to the present invention comprises: a service-type recording section for recording a service type of communication to be handled; an interface recording section for recording a type of an external interface with an external network received from a mobile router relaying to the external network; an interface decision section for selecting at least one or more of external interfaces adapted for the service type; a transmission section for notifying first information of the external interface selected to the mobile router of within a same segment. This makes it possible to select an external interface on the initiative of the mobile communication device, in accordance with the characteristic of a service the mobile communication device is to handle.

Meanwhile, a mobile communication device of the invention further comprises a priority decision section for deciding a priority of the external interface selected, wherein the transmission section generates second information added the first information with the priority and notifies the second information. This allows the mobile communication device to designate a priority in selecting a plurality of external interfaces.

Meanwhile, in a mobile communication device of the invention, selecting a group of the external interfaces is from a plurality of external interfaces of within the mobile router.

This allows the mobile communication device to select an external interface, for the mobile router providing a plurality of external interfaces.

Meanwhile, in a mobile communication device of the invention, the interface recording section further records link status information of the external interface received, and the transmission section added the second information with the link status information thereby makes a notification. Due to this, among a plurality of mobile routers having external interfaces currently connectable, a mobile router can be given information for using an interface optimal for connection with an external network.

Meanwhile, in a mobile communication device of the invention, the service-type recording section records a significance of a parameter representative of a characteristic of the service type, and the interface decision section decides an external interface on the basis of the significance. This can preferentially select an external interface having a characteristic significant for service.

Meanwhile, in a mobile communication device of the invention, there is a function for a user to change at least one of the service type and the significance of a parameter. This can reflect the preference of a user of the mobile communication device in selecting an external interface.

Meanwhile, in a mobile communication device of the invention, the service-type recording section has a function to record the significance of a parameter by downloading from the external network. This can update the parameter significance to a newest one and reflect it in interface selection.

Meanwhile, in a mobile communication device of the invention, the interface decision section takes a same parameter as the parameter of service type as a parameter representative of a characteristic of the external interface, the parameters of the external interfaces each having further information recording a superiority, the external interface being determined on a basis of the significance and the superiority of the parameter. This allows the mobile communication device to select an external interface optimal for service.

Meanwhile, in a mobile communication device of the invention, the service-type recording section has a function for a user to change at least one of the service type, the significance and the superiority of a parameter. This can reflect the preference of a user of the mobile communication device in selecting an external interface.

Meanwhile, in a mobile communication device of the invention, the service-type recording section has a function to record at least any one of the significance and the superiority of a parameter by downloading from the external network. This can update the parameter significance to a newest one and reflect it in interface selection.

Meanwhile, a mobile communication device of the invention further has a collection timer managing section for managing a period to receive the external interface type from the mobile router, wherein the interface decision section selects an external interface after receiving a notification of elapse of a predetermined time from the collection timer managing section. This can select external interface from among the all obtainable at that time.

A mobile router of the invention comprises: an interface-type recording section for recording external-interface-type information as interface information for connection with an external network; a connection-interface recording section for receiving and recording connection information for deciding an external interface for relaying with the external network, from a mobile communication device received the external-interface type information; a connection decision section for deciding whether or not to relay communication of from the mobile communication device, on the basis of the connection information; and a router transmission section for multicasting the external-interface-type information and making a notification to the mobile communication device selected for decision of relaying. This allows the mobile router to provide the external interface selected by the mobile communication device.

Meanwhile, in a mobile router of the invention, the connection information has a plurality of external interface types, the connection decision section selecting one external interface from the external interface types. This allows the mobile router to provide the external interface selected by the mobile communication device.

Meanwhile, in a mobile router of the invention, the connection information is further added with a priority on each of the external interface types, and the connection decision section selects the external interface according to the priority. This makes it possible to use a suited one of among the external interfaces selected by the mobile communication device.

Meanwhile, a mobile router of the invention further comprises a timer managing section for managing a time of up to a notification to relay by the connection decision section to the mobile communication device, wherein the connection decision section makes a notification after a lapse of the time set shorter as the priority is higher. This makes it possible to notify another mobile router that there are higher ones in priority than the relevant unit.

Meanwhile, in a mobile router of the invention, the connection decision section allows for relaying in a case the external interface is in a connectable status and the priority is the highest. This allows the mobile router to use the highest one in priority of among the external interfaces selected by the mobile communication device.

Meanwhile, a mobile router of the invention further comprises an external-link monitor section for notifying a change of link status to the mobile communication device and another mobile router through the router transmission section in a case the external interface is changed in link status. Due to this, when there is a link status change in the external interface, it is possible to swiftly provide an opportunity for switching the external interface.

Meanwhile, in a mobile router of the invention, the connection interface recording section updates information of connection status on a basis of a notification of link status change received from the other mobile router, and the connection decision section allows for relaying in a case the external interface is in a connectable status and the priority is the highest from the information of connection status after the update. Due to this, due to a link status change in the external interface, the external interface can be switched by between the mobile routers.

Meanwhile, a mobile communication system comprises a mobile communication device and a mobile router. Due to this, whenever the mobile communication device desires to communicate with an external network, an optimal external interface can be selected from the mobile router thereby enabling communication.

As described above, according to the present invention, the mobile communication device, even when there is a link status change in the external interface of the mobile router, can swiftly switch the external interface thereby continuing communication and avoid congestion in communication between the mobile communication device and the mobile router.

BRIEF DESCRIPTION OF THE DRAWINGS

FIG. 4 is a figure showing an example of a service-type recording section of the mobile communication device according to embodiment 1 of the invention.

FIG. 5 is a figure showing an example of an interface recording section of the mobile communication device according to embodiment 1 of the invention.

BEST MODE FOR CARRYING OUT THE INVENTION

Embodiments of the present invention will now be explained with reference to the drawings. Incidentally, like constituent elements are shown attached with like references.

Embodiment 1

Figure 1:
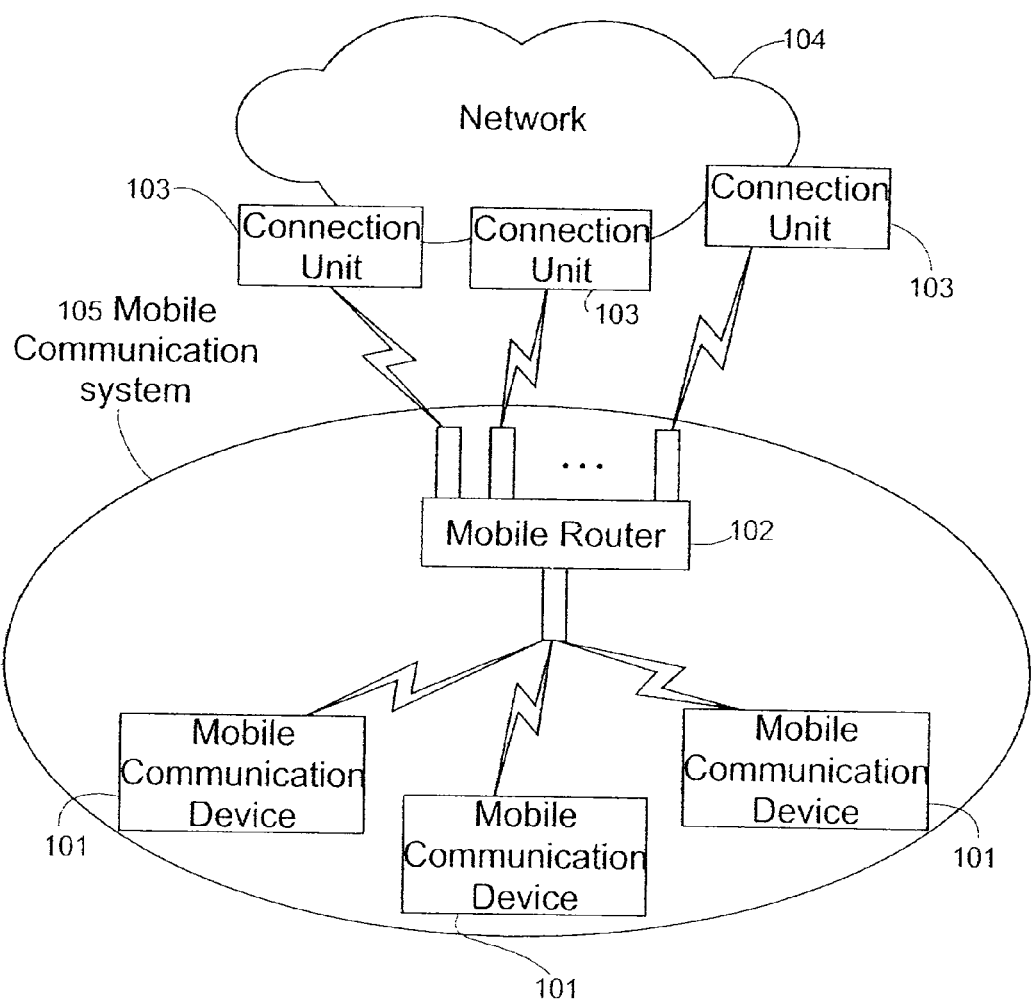
FIG. 1 is a diagram showing a configuration of a mobile communication system according to embodiment 1 of the present invention.

FIG. 1 is a diagram showing an arrangement of a mobile communication system 105 and an external network in the present embodiment.

In FIG. 1, mobile communication devices 101 are terminal units for handling information. A mobile router 102, having a common wireless interface, is allowed for communication with the mobile communication device 101. Meanwhile, the mobile router 102 possesses a plurality of interfaces to be connected to connection units 103 provided in the external network 104, having a function to relay information from the mobile communication device 101 to the external network 104 or to relay information from the external network 104 to the mobile communication device 101. The mobile communication units 101 and the mobile router 102 constitute a mobile communication system.

The connection units 103 may be an access point of IEEE802.11, an access point of HIPERLAN, an access point (base station) of PDC network, an access point (base station) of third-generation cellular telephone network (CDMA2000, W-CDMA), or an access point of fourth-generation mobile communication system, for example.

Figures 2, 3:
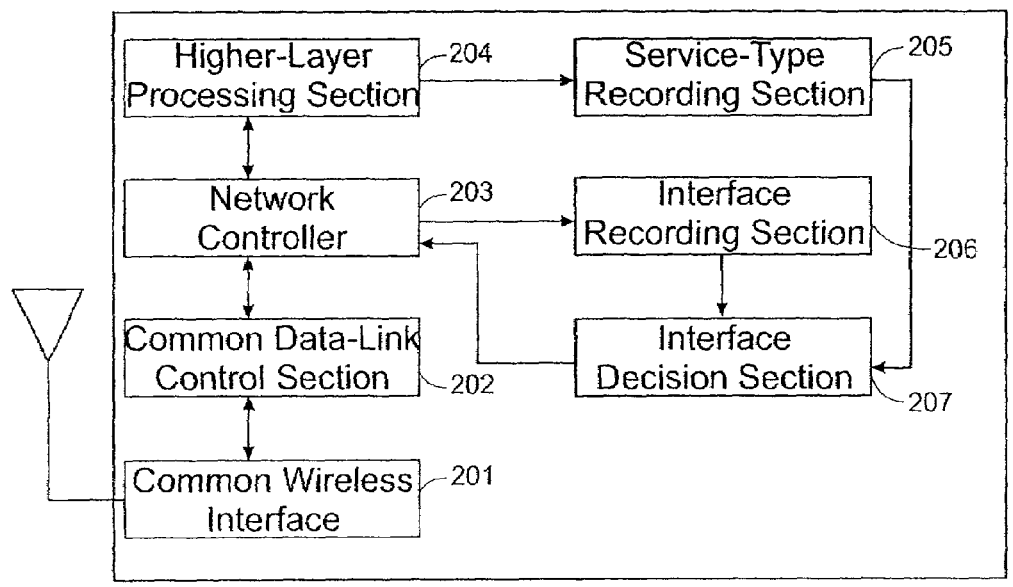
FIG. 2 is a block diagram showing a configuration of a mobile communication device according to embodiment 1 of the invention.
FIG. 3 is a figure showing an example of a service-type recording section of the mobile communication device according to embodiment 1 of the invention.

FIG. 2 is a block diagram showing a configuration of the mobile communication device 101 of the invention. This is arranged with a common wireless interface 201, a common data-link control section 202, a network controller 203, a higher-layer processing section 204, a service-type recording section 205, an interface recording section 206 and an interface decision section 207.

The common wireless interface 201 is arranged with an antenna, an RF circuit and a base-band processing circuit. This carries out a processing to modulate the signal received from the common data-link control section 202 and convert it into a wireless signal to be transmitted through the antenna, and to demodulate a wireless signal received from the antenna and deliver a digital signal to the common data-link control section 202.

The common data-link control section 202 carries out a processing to make a framing on the signal obtained from the network controller 203 by use of a format defined by a predetermined data-link layer, and deliver it to the common wireless interface 201, a processing to detach a data-link layer header and tailer from the digital signal received from the common wireless interface 201 and deliver it to the network controller 203, and a processing to acquire the right to access wireless media according to an access scheme defined by the data-link layer.

The common wireless interface 201 and the common data-link control section 202 are common in the mobile communication unit, which are those as prescribed under IEEE802.11a, IEEE802.11b, IEEE802.11e, Bluetooth or UWB, for example.

The network controller 203 is equipped with an Internet protocol (IP), to exchange data with the higher-layer processing section 204 and common data-link control section 202 according to the IP. The network controller 203 carries out a processing to generate a message requesting for the interface information the mobile router 102 possesses, a processing to obtain the interface information and deliver it to the interface recording section 206, and a processing to generate an interface-designation notification message storing interface-type information as designated by the interface decision section 207. The interface-designation notification message is used to notify an interface for use in the mobile router 102. The network controller 203, the common wireless interface 201 and the common data-link control section 202 constitute a transmitter section.

The higher-layer processing section 204 carries out a layer processing of the IP layer and higher layers, to exchange data with the network controller 203 as required.

The service-type recording section 205 is a memory to record the type of services to be handled by the mobile communication device 101. FIG. 3 is a service type table showing a service type and service characteristic significance of the relevant unit, recorded in the service-type recording section 205. For example, where the mobile communication device 101 excutes the functions of voice telephone service, real-time moving image communication and Internet connection, the identifiers representative of real-time voice communication, real-time moving image communication and Internet communication are recorded in a service field 302, as shown in FIG. 3. When such service is needed, a flag is set in a relevant parameter field 301. This attribute can be changed by user's setting. When the user makes a setting not to use the telephone function as shown in FIG. 4, the higher-layer processing section 204 delivers telephone-function non-permission information to the service-type recording section 205, thereby setting an valid flag 401, 402 only in the parameter field 301 pertaining to real-time moving image communication and Internet communication.

The interface recording section 206 is a memory to record the type information of an interface which the mobile router 102 possesses. Incidentally, the type information of an external interface is extracted, in the network controller 203 from the interface information notification message received from the mobile router 102 and then delivered to the interface recording section 206. FIG. 5 shows an example of interface type information. There is shown herein that the mobile router 102 has an IPv6 global address 501 of 3ffe:501::100:204:b1ff:fe98:3ed and possesses interface types 502-504 based on IEEE802.11a, W-CDMA and PDC.

Figures 6, 7:
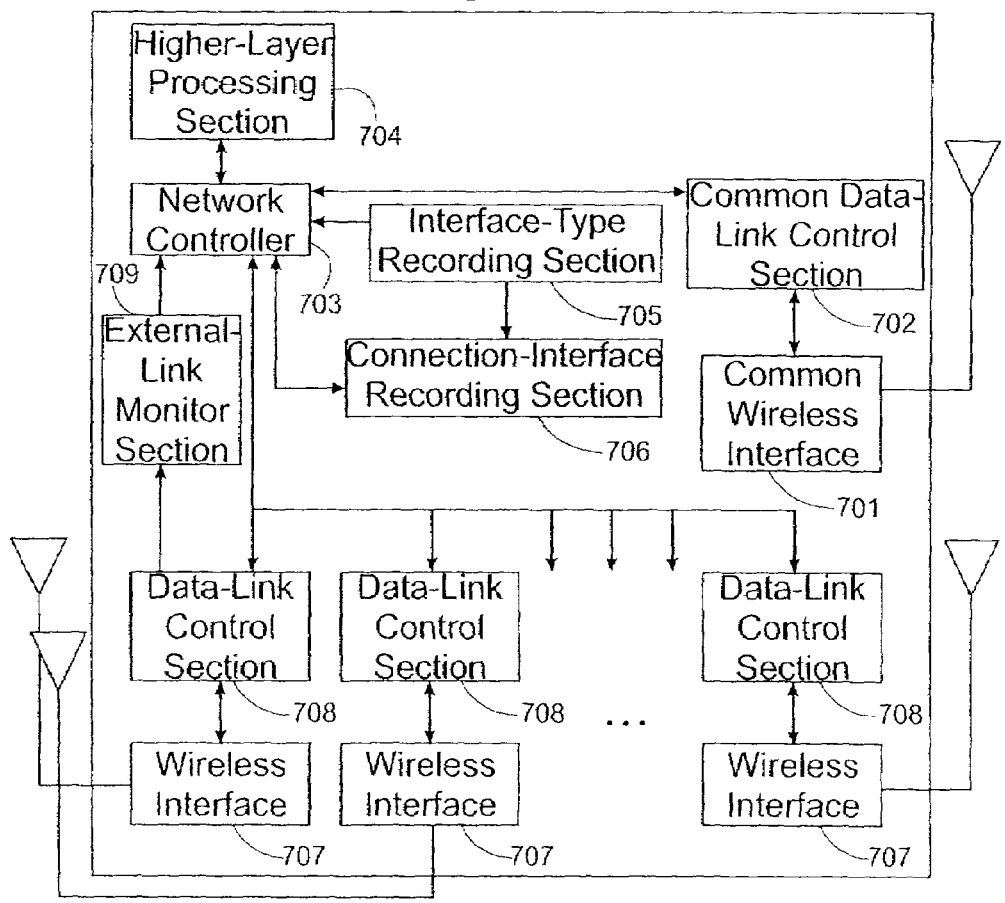
FIG. 6 is a figure showing an example of matrix information in an interface decision section of the mobile communication device according to embodiment 1 of the invention.
FIG. 7 is a block diagram showing a configuration of a mobile router according to embodiment 1 of the invention.

The interface decision section 207 carries out a processing to decide an interface the mobile router 102 is to select, from the information stored in the service-type recording section 205 and interface recording section 206. The interface decision section 207 stores the matrix information for selecting at least one interface so that it can decide an interface according to the information. As shown in FIG. 6, the matrix information is set with a superiority of each service type, as points on each characteristic. The interface decision section 207 is to decide a service type for use by use of the service-type table and matrix information.

For example, the service to be handled by the mobile communication device 101 is only on real-time moving image communication and Internet communication, as shown in FIG. 4. For real-time moving image communication, all the parameters excepting voice, area and price are the most significant (AA in FIG. 4) and the parameters of area and price are significant (A in FIG. 4). For Internet communication, the parameters of speed and price are the most significant and the parameter of area is significant.

In this case, because the interface possessed by the mobile router 102 is IEEE802.11a, W-CDMA and PDC from FIG. 5, the parameters of each interface of the matrix shown in FIG. 6 are weighted by significance, thereby making a calculation on each of the interfaces.

For example, by a calculation with 0.5 times for the most significant (AA in FIG. 4), 0.3 times for the significant (A in FIG. 4) and 0 times for the non-significant (B in FIG. 4), the sum over relevant parameters in real-time moving image communication is given "7.1" on IEEE802.11a, "7.2" on W-CDMA and "5.9" on PDC. As a result, W-CDMA is decided as an interface for use and notified to the network controller 203.

Likewise, in Internet communication, because the sum over relevant parameters is "5.6" on IEEE802.11a, "2.9" on W-CDMA and "3.5" on PDC, IEEE802.11a is decided as an interface for use and notified to the network controller 203.

FIG. 7 is a block diagram showing a configuration of the mobile router 102 of the present invention. This is configured with a common wireless interface 701, a common data-link control section 702, a network controller 703, a higher-layer processing section 704, an interface-type recording section 705, connection-interface recording sections 706, wireless interfaces [1 . . . n] 707 and data-link control sections [1 . . . n] 708.

The common wireless interface 701 and the common data-link control section 702 are a functional block for communication with the mobile communication device 101. This has a function similar to that of the common wireless interface 201 and data-link control section 202 of the mobile communication device 101.

The wireless interfaces (1)-(n) 707 are wireless interfaces in the number of n for getting an access to the external network 104, having different characteristics, e.g. the wireless interface (1) 707 is based on IEEE802.11a, and the wireless interface (2) 707 is on W-CDMA. The wireless interfaces (1)-(n) 707 are configured with an antenna, an RF circuit and a base-band processing circuit. This carries out a processing to modulate the signal received from the data-link control section (1)-(n) 708 and convert it into a wireless signal to be sent at the antenna, and a processing to demodulating the signal received from the antenna and deliver a digital signal to the data-link control section 708.

The data-link control sections (1)-(n) 708 are data-link control sections corresponding to the wireless interfaces (1)-(n) 707, similarly having different characteristics. The data-link control sections (1)-(n) 708 carry out a framing on the signal obtained from the network controller 703 according to a format as defined by a predetermined data-link layer. This makes a processing of delivery to the wireless interface 707, a processing to detach a data-link layer header and tailer from the digital signal received from the wireless interface 707 and deliver it to the network controller 703, and a processing to acquire the right to access a wireless media according to an access scheme as defined by a data-link layer.

The network controller 703 makes a processing to analyze the interface-designation notification message received from the mobile communication device 101 and record an identifier of the mobile communication device 101 and an interface identifier for use to the connection-interface recording section 706. Furthermore, it makes a processing to generate an interface-information notification message to be sent to the mobile communication units 101 being under the dominance of the relevant unit, from the information stored in the interface-type recording section 705. The interface-information notification message is stored with a pair of interface-type information in a connectable state and an interface identifier. The network controller 703 is equipped with an Internet protocol (IP), to make a processing of exchanging data between the higher-layer processing section 704 and the common data-link control section 702 or data-link control sections (1)-(n) 708. When transferring a message from the mobile communication device 101 to the external network, setting is made to transfer it at the wireless interface 707 designated in the connection-interface recording section 706. The network controller 703, the common wireless interface 701 and the common data-link control section 702 constitute a router transmitter section.

The higher-layer processing section 704 carries out a layer processing of the IP layer and higher layers, to exchange data with the controller 703 as required.

Figures 8, 9, 10:
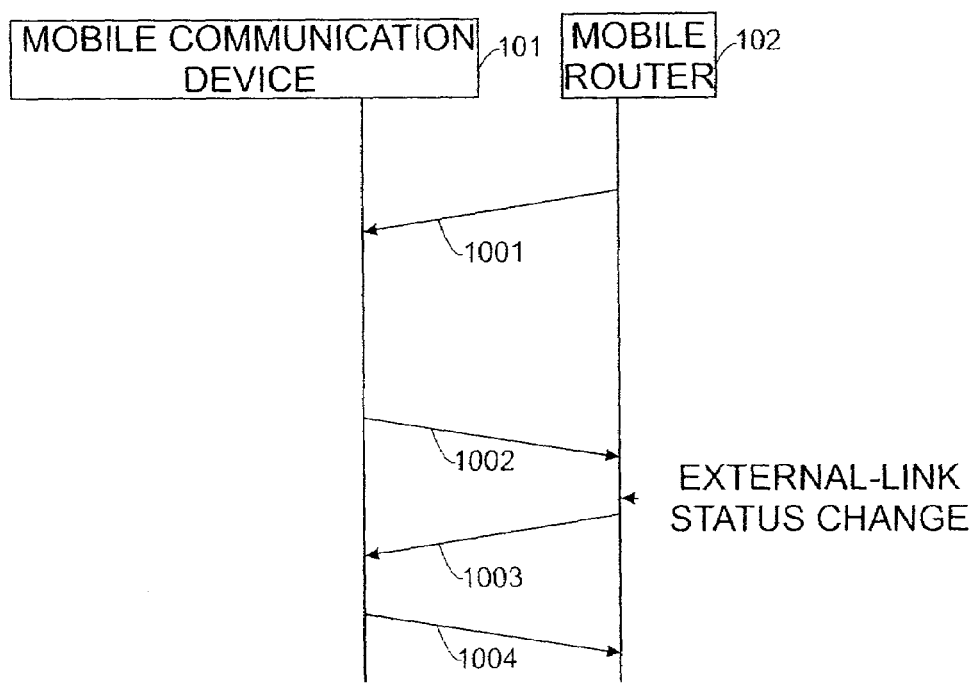
FIG. 8 is a figure showing an example of an interface recording section of the mobile router according to embodiment 1 of the invention.
FIG. 9 is a figure showing an example of a connection-interface recording section of the mobile router according to embodiment 1 of the invention.
FIG. 10 is a sequence chart showing an operation sequence on the mobile communication device according to embodiment 1 of the invention.

The interface-type recording section 705 is a memory storing a connection permission table as interface-type information possessed by the mobile router 101. This is configured with an interface-type field 801, an interface identifier field 802 and a link status 803, as shown in FIG. 8. Here, the interface identifier 802 is used as an IPv6 global address, to store interface types 801 (IEEE802.11a, b, e, W-CDMA, PDC) on the respective identifier.

The connection-interface recording section 706 is to record an interface type and mobile communication device identifier contained in the interface-designation notification message received from the mobile communication device 101. FIG. 9 shows an example of the connection-interface recording section 706. This shows that a W-CDMA interface 902 is to be used in order for communication between the mobile communication device 101 designated by the mobile communication device identifier 901 and the external network 104.

The external-link monitor section 709 has a function to examine a connection status with the external network 104. From the data-link control section 708 is delivered the reception power level information, error rate and presence/absence of receiving a beacon signal of a signal received at the wireless interface 707, to the external-link monitor section 709. The external-link monitor section 709 can receive a particular signal, such as a beacon signal, from the information of from the data-link control section 708. When error rate is within a permissible range and reception level is sufficiently high, it decides that connection is possible with the external network 104. In the connection permission table, link status 803 is set to "connected". The external-link monitor section 709, when external-link status is changed, i.e. when link status is changed from connection to non-connection or from non-connection to connection, delivers an external link change and post-change status to the network controller 703, thereby instructing to generate an interface-information notification message. This process is effected at all times.

The operation is now explained of the mobile communication device 101 and mobile router 102 configured as in the above.

Figure 27:
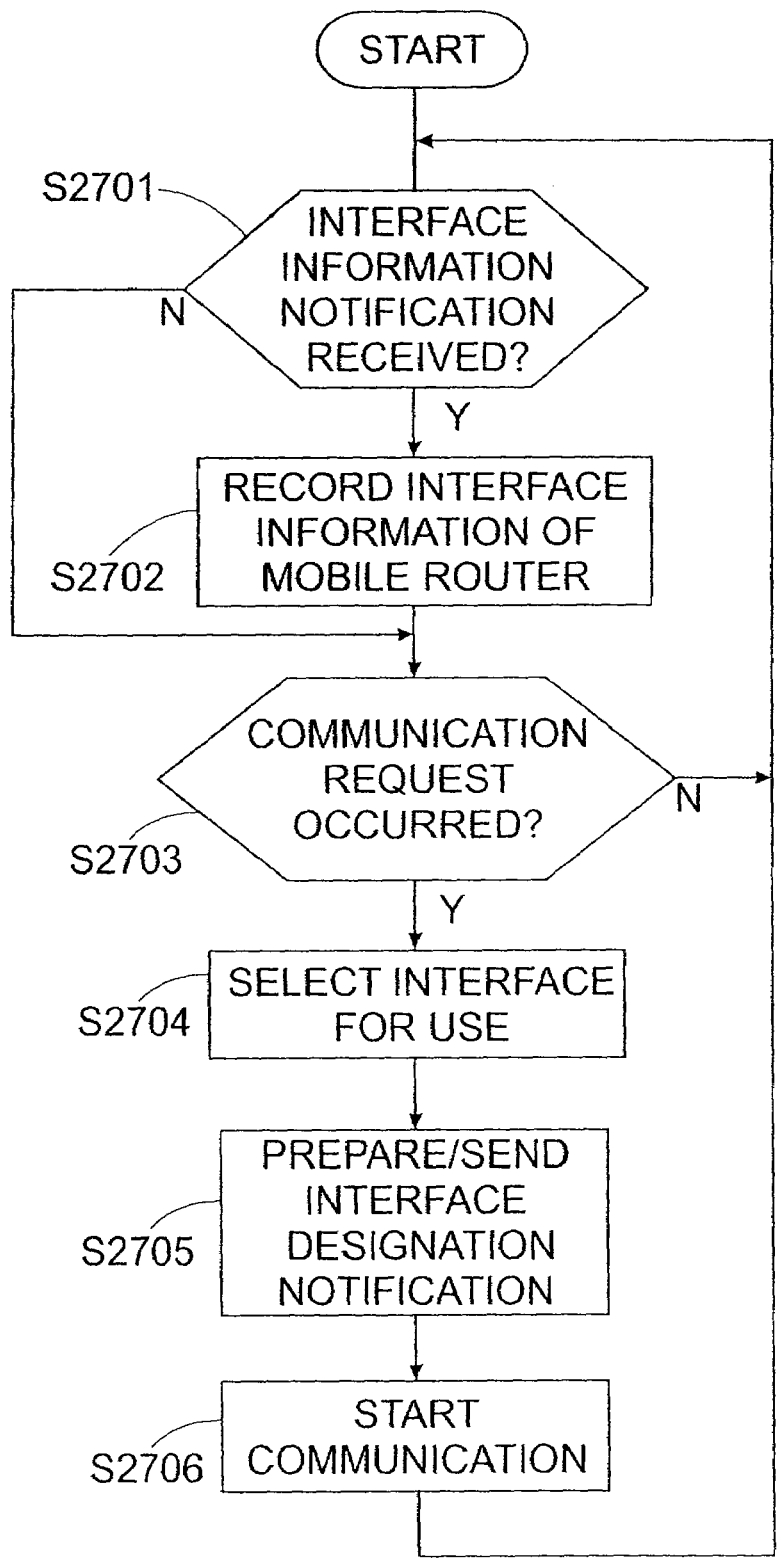
FIG. 27 is a flowchart showing an operation of the mobile communication device according to embodiment 1 of the invention.
Figure 28:
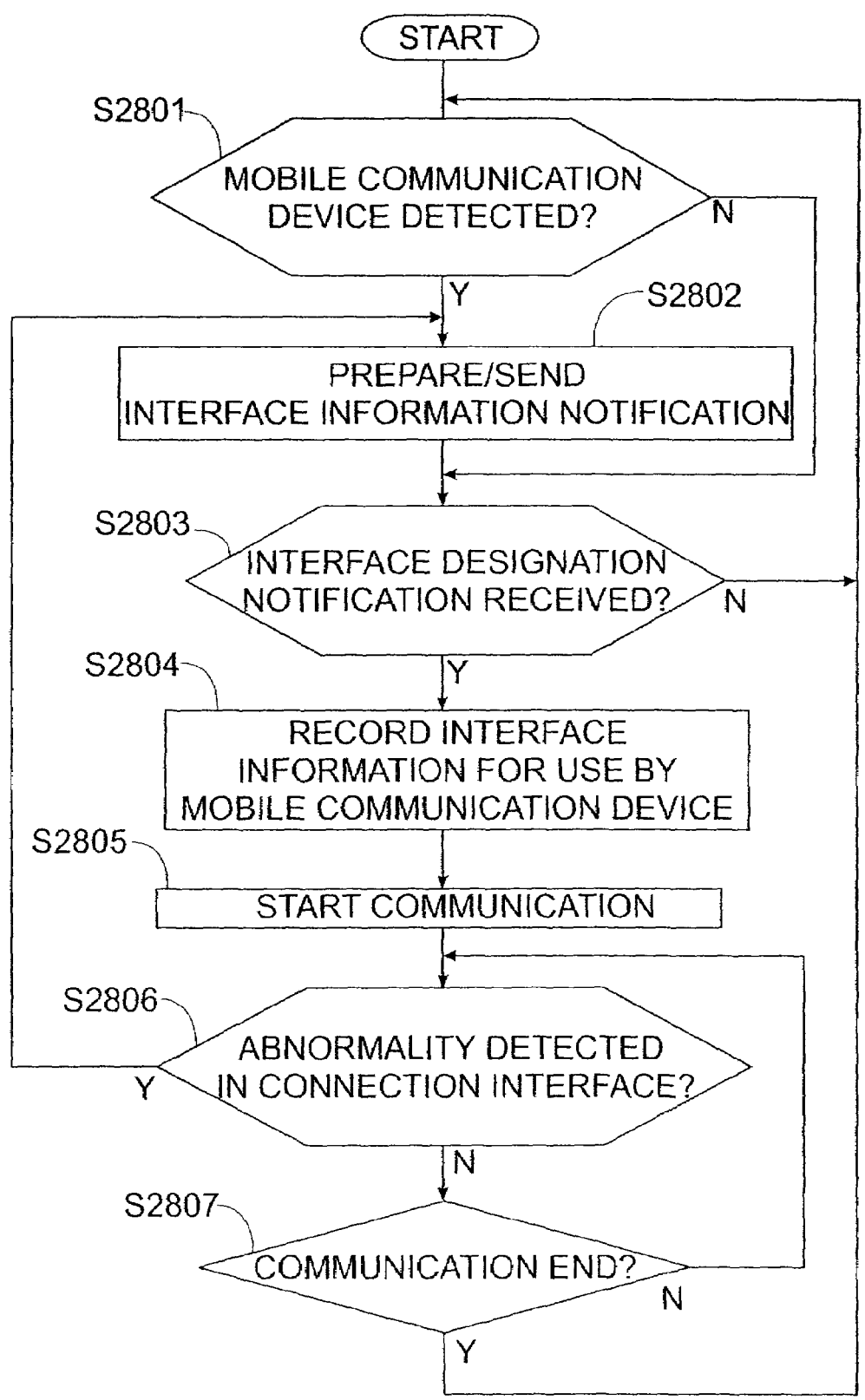
FIG. 28 is a flowchart showing an operation of the mobile router according to embodiment 1 of the invention.

FIG. 10 shows a sequence of up to determining an interface of the mobile router 102 for the mobile communication device 101 to connect with the external network 104. FIG. 27 is a flowchart showing an operation of the mobile communication device 101 while FIG. 28 is a flowchart showing an operation of the mobile router 102.

At first, the higher-layer processing section 704 of the mobile router 102 checks for a new entry of mobile communication device 101 according to a router selection message received from the mobile communication device 101 through the common wireless interface 701 (step S2801).

Figure 24:
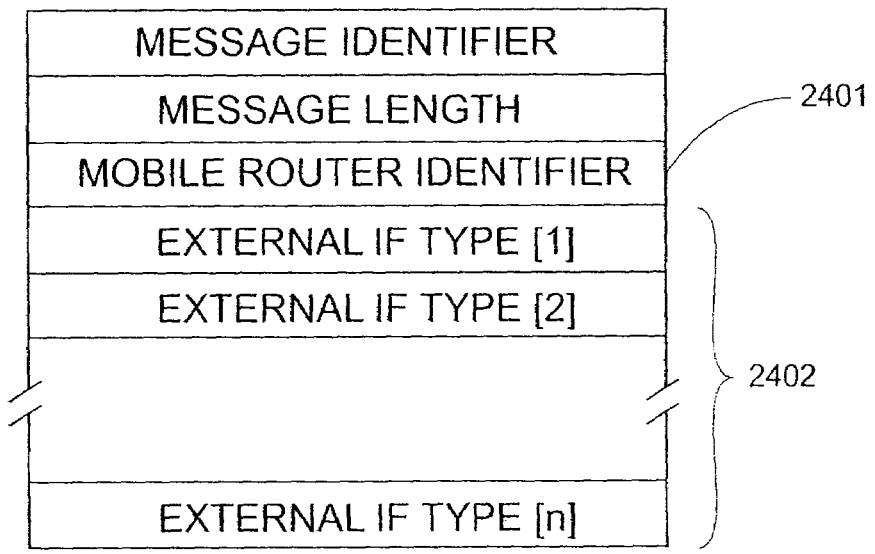
FIG. 24 is a figure showing a configuration of an interface information notification to be generated by the mobile communication device according to embodiment 1 of the invention.

When the higher-layer processing section 704 detects a new entry of mobile communication device 101, the network controller 703 receives a notification thereof and makes an interface-information notification message 1001 as shown in FIG. 24 from the information of within the interface-type recording section 705, to send it to the newly entered mobile communication device 101 through the common wireless interface 701 (step S2802). Here, in the interface-information notification message, its own identification code is set in a mobile router identifier 2401 and an interface identification code to external network 104 possessed by it own is set in an external-interface type 2402.

Meanwhile, the network controller 203 of the mobile communication device 101 checks for reception of an interface-information notification message (step S2701). When an interface-information notification message is received, the interface type 902 and mobile communication device identifier 901 stored therein are stored to the interface recording section 206 (step S2702). In the case of not receiving an interface-information notification message, the process moves to the next step S2703.

Next, the higher-layer processing section 204 of the mobile communication device 101 checks for whether there is generated a communication request to the external network 104 (step S2703). In the case of generation, the higher-layer processing section 204 searches, in the service-type recording section 205, for a significance parameter corresponding to a service for communication, and decides an interface for use from the information stored in the interface recording section 206 and matrix information stored in the interface decision section 207 (step S2704).

Figure 25A:
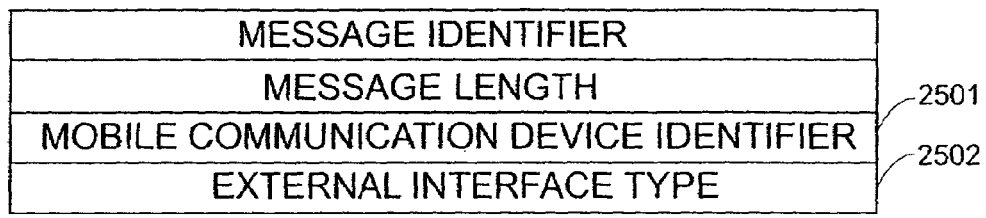
FIG. 25A is a figure showing a configuration of an interface designation notification to be generated by the mobile communication device according to embodiment 1 of the invention.

The network controller 203 of the mobile communication device 101, after deciding an interface for use, generates an interface-designation notification message 1002 as shown in FIG. 25A and sends it to the mobile router 102 through the common wireless interface 201 (step S2705). Here, in the interface-designation notification message, its own identification code is set in the mobile communication device identifier 2501 and an external interface type for use is set in the external interface type 2502.

Next, the network controller 703 of the mobile router 102 checks for reception of an interface-designation notification message 1002 from the mobile communication device 101 (step S2803). The network controller 703, when receiving an interface-designation notification message 1002, extracts an identifier 901 of the mobile communication device 101 and an interface type 902 for use from the interface-designation notification message and records it to the connection-interface recording section 706 (step S2804).

From then on, the interface designated is used in communication between the mobile communication device 101 and the external network 104 (step S2805, S2806).

Next, explained is the operation in the event that, after a start of communication, abnormality occurs on the connection line to the external network being offered by the mobile router 102.

The external-link monitor section 709 of the mobile router 102 checks for abnormality of the interface being connected (step S2806). When detecting an abnormality, the external-link monitor section 709 updates the information within the interface-type recording section 705, and instructs the network controller 703 to send an interface-information notification message 1003. The step returns to S2802. When there is no detection of abnormality, it is decided whether a communication end or not (step S2807), to continue abnormality detection to the end.

Meanwhile, the mobile communication device 101, after the start of communication, returns to the step S2701. When receiving an interface-information notification 1003, carries out is a process of from step S2702 to step S2706, to send an interface-designation notification 1004 and change over to a new interface thereby continuing communication.

As described above, in the present embodiment, in the case that a mobile communication device having no means for direct communication with an external network communicates with an external network by way of a mobile router having an interface to a variety of external networks, an interface to the external network is selected in accordance with a characteristic of a service to be handled by the mobile communication device and notified to the mobile router, thereby allowing for designating an interface optimal for the service. Meanwhile, by prohibiting communication through an interface not satisfying the service characteristic, it is possible to prevent against the fear that a third party get information as concerned due to switching over of the interface, the fear to deteriorate the quality of communication data and the fear to interfere with communication of other mobile communication device. Meanwhile, in the event of abnormality occurrence on the external network during communication, the mobile router voluntarily notifies new interface information to the mobile communication device. There is no need for the mobile communication device to frequently inquire about interface information to the mobile router, making it possible to avoid congestion over the line between the mobile communication device and the mobile router.

Embodiment 2

In embodiment 2, a mobile communication device 101, a mobile router 102 and a mobile communication system 105 have the same configuration as those of embodiment 1 shown in FIG. 1.

Figure 11:
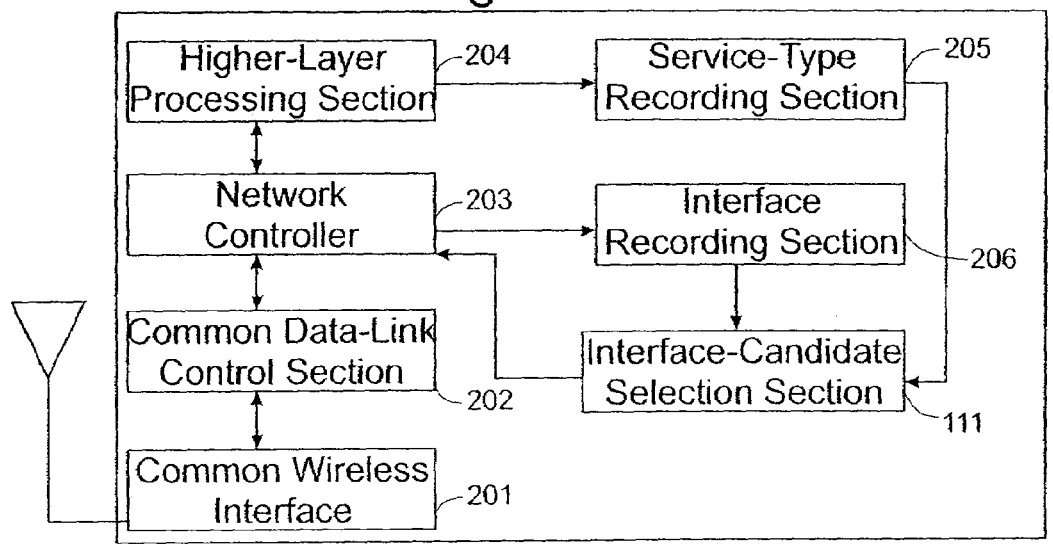
FIG. 11 is a block diagram showing a configuration of a mobile communication device according to embodiment 2 of the invention.

FIG. 11 is a block diagram showing a configuration of the mobile communication device 101 in the present embodiment.

In FIG. 11, an interface-candidate selecting section 111 makes a processing to select a candidate of an interface the mobile router 102 is to select upon communication of the present mobile communication device 101 with the external network 104, from the information stored in a service-type recording section 205 and interface recording section 206. The interface-candidate selecting section 111 has a function of an interface decision section added with a priority decision section for deciding a priority in an external interface group as a gathering of the external interfaces decided by the interface decision section. The interface-candidate selecting section 111 is stored with matrix information for selecting at least one interface, and decides an interface candidate according to the information.

The difference lies in that the interface-candidate selecting section 111 is provided in place of the interface decision section 207, and the other constituent elements are the same.

Assuming that the mobile router through which the present mobile communication device 101 communicates with the external network 104 possesses interfaces of IEEE802.11a, W-CDMA and PDC similarly to embodiment 1, the sum over relevant parameters in real-time moving image communication is given "7.1" on IEEE802.11a, "7.2" on W-CDMA and "5.9" on PDC. Here, the highest-level of real time communication is assumed to have superiorities as shown in FIG. 6 of all "5" and significances shown in FIG. 3 of all "AA", its score becomes "10.5". At this time, in a case the threshold of interface selection is set at 60%, the threshold is given "6.3". The interface-candidate selecting section 111 decides W-CDMA and IEEE802.11a as interface candidates and delivers information to the network controller 203.

Likewise, in Internet communication, the sum over relevant parameters is "5.6" on IEEE802.11a, "2.9" on W-CDMA and "3.5" on PDC wherein the threshold is "3.9". Accordingly, the interface-candidate selecting section 111 decides IEEE802.11a as an interface candidate and delivers information to the network controller 203.

Figure 25B:
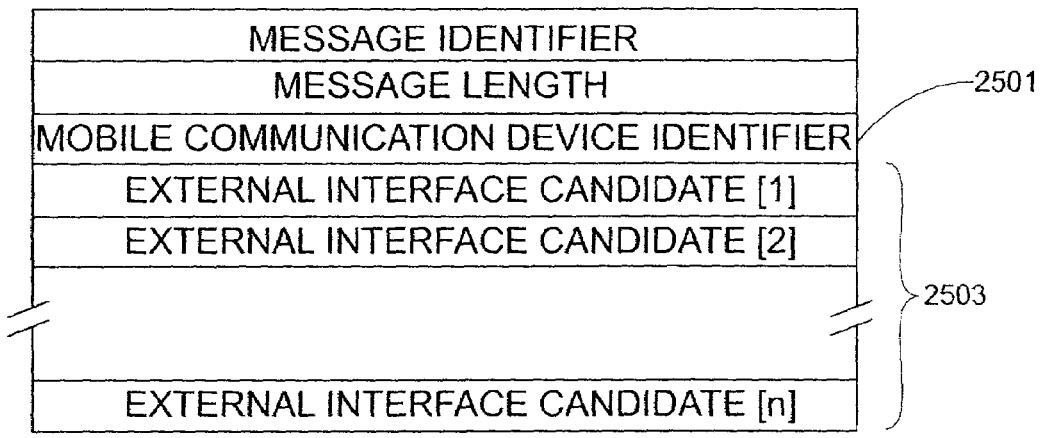
FIG. 25B is a figure showing a configuration of interface candidates to be generated by the mobile communication device according to embodiment 2 of the invention.

The network controller 203 generates an interface-candidate message storing a plurality of selectable pieces of interface-type information as shown in FIG. 25B, in place of the interface-designation notification message mentioned in embodiment 1. In FIG. 25B, its own identification code is set to a mobile communication device identifier 2501 while an external interface type selected as a candidate is set to an external interface candidate 2503.

Figure 12:
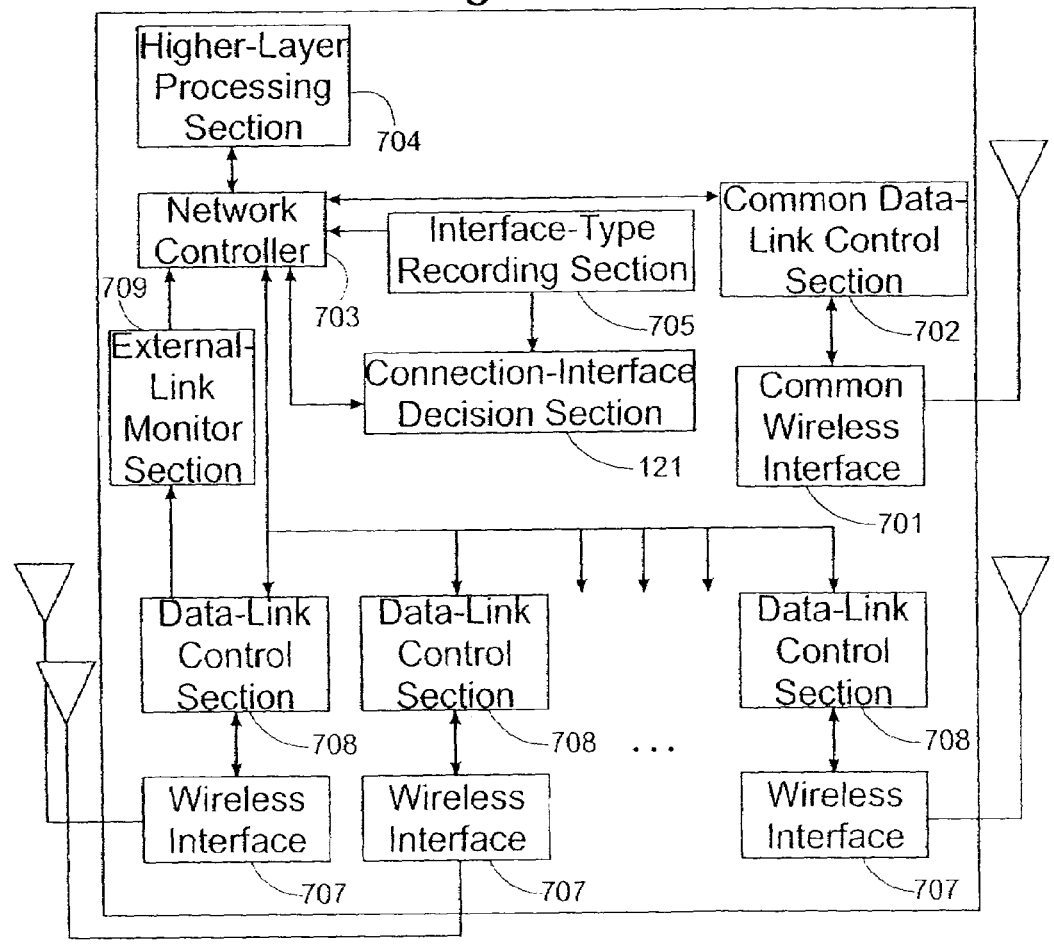
FIG. 12 is a block diagram showing a configuration of a mobile router according to embodiment 2 of the invention.

FIG. 12 is a block diagram showing a configuration of a mobile router 102 in the present embodiment.

Figures 13, 14:
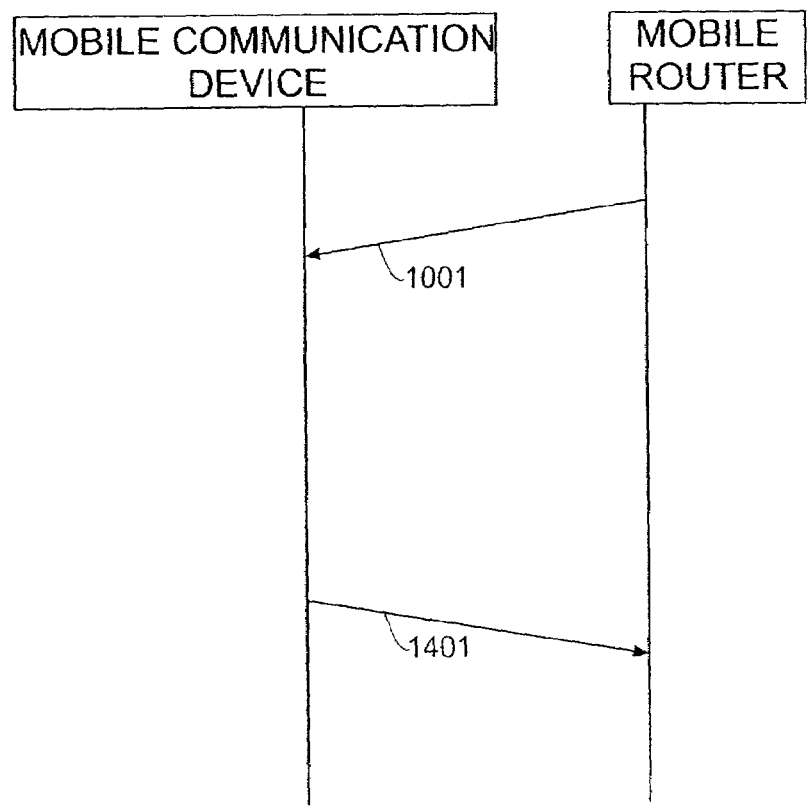
FIG. 13 is a figure showing an example of an interface candidate table in a connection-interface decision section of a mobile router according to embodiment 2 of the invention.
FIG. 14 is a sequence chart of up to a decision of an external interface to be connected by the mobile communication device according to embodiment 2 of the invention.

A connection-interface decision section 121 carries out a process to record an interface type and mobile communication device identifier contained in the interface-candidate message received from the mobile communication device 101, and a process to decide an interface for use in communication from among the recorded interfaces. FIG. 13 shows an example of an interface-candidate table to be stored in the connection-interface decision section 121. This shows that any of W-CDMA, IEEE802.11a and interface type 1302 is to be used in order for communication between the mobile communication device 101 designated by the mobile communication device identifier 1301 and the external network. The difference lies from the mobile router of embodiment 1 in that the interface decision section 121 is provided in place of the interface recording section 706, and the other constituent elements are the same as that. Incidentally, the interface decision section 121 has functions as a connection-interface recording section 706 and a connection-decision section for deciding an interface for use in communication from among the interfaces recorded therein.

When transferring data to the external network 104, a beacon signal or reception power level information is obtained from the data-link control section 708 of each interface recorded in the connection-interface decision section 121, to select an interface connectable with the external network 104. When connection is available on all the interfaces as candidates, selected is the interface used up to the immediately before or the minimum one in the interface ID attached for the purpose of interface identification or so, i.e. sole one interface is selected arbitrarily.

Figure 29:
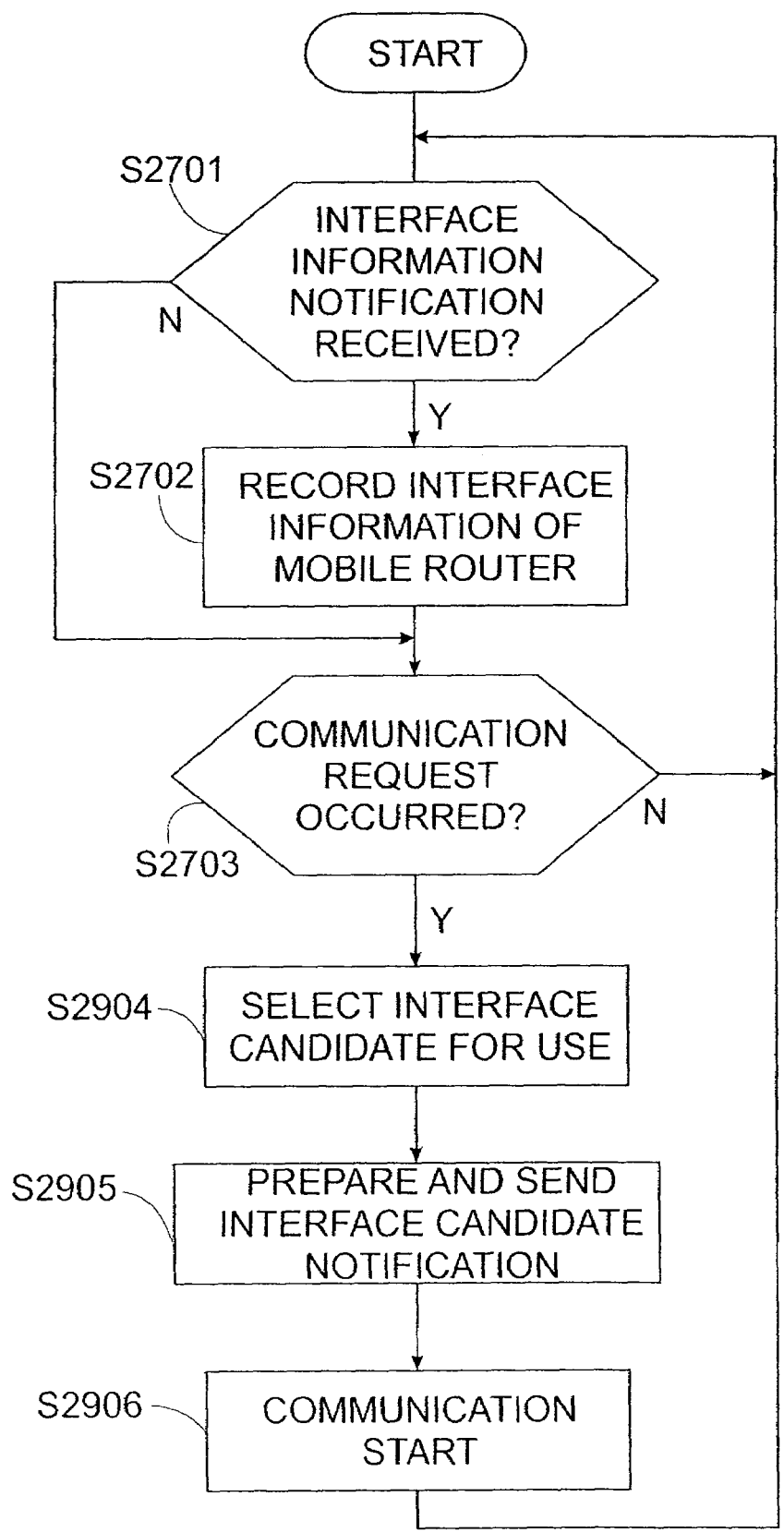
FIG. 29 is a flowchart showing an operation of the mobile communication device according to embodiment 2 of the invention.
Figure 30:
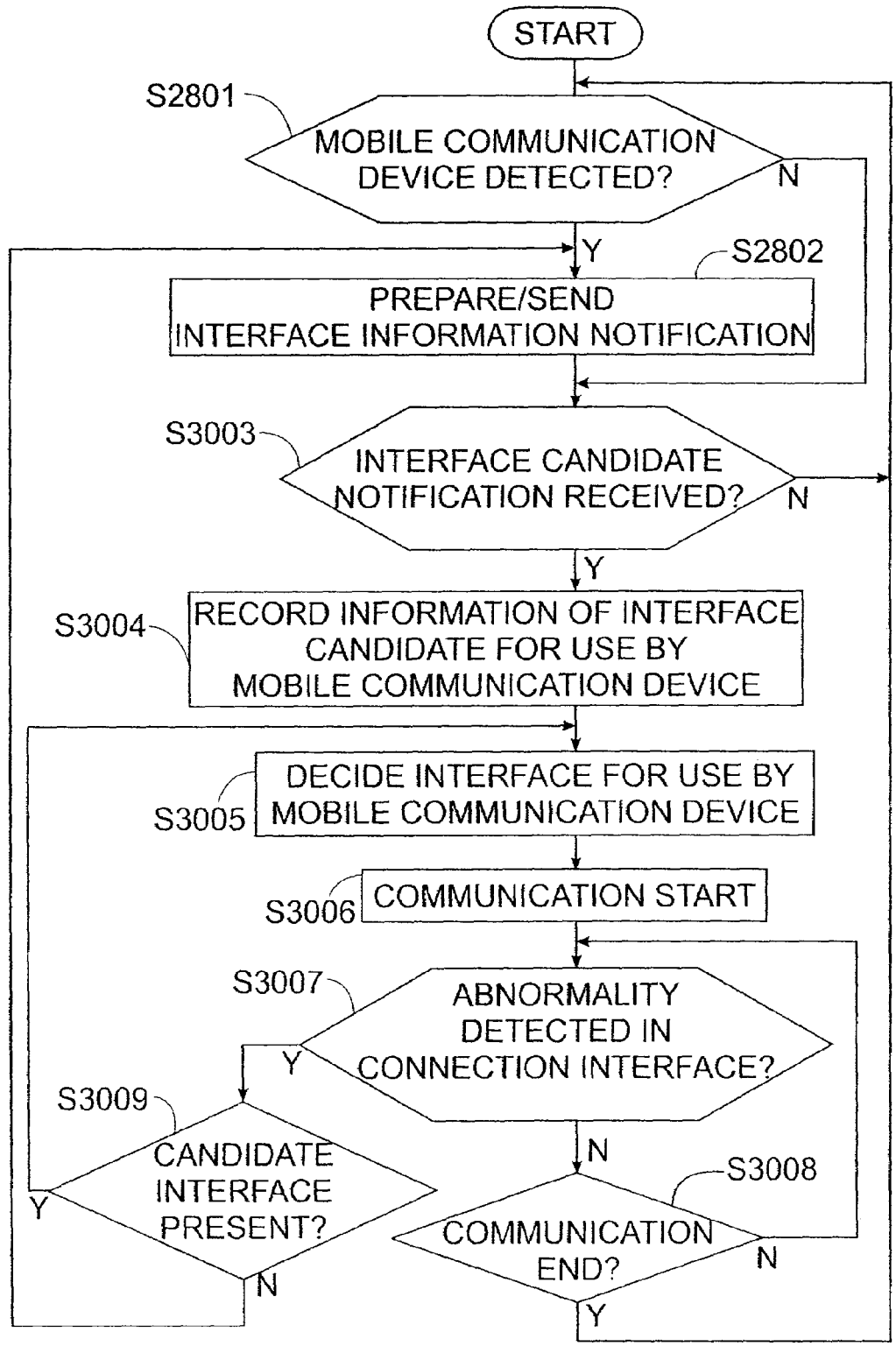
FIG. 30 is a flowchart showing an operation of the mobile router according to embodiment 2 of the invention.

FIG. 14 shows a sequence of up to determining an interface of the mobile router 102 for the mobile communication device 101 to connect with the external network 104. FIG. 29 is a flowchart showing an operation of the mobile communication device 101 while FIG. 30 is a flowchart showing an operation of the mobile router 102.

The operation at steps S2701 to S2703 on the mobile communication device 101 and the operation at steps S2801 and S2802 on the mobile router 102 are the same as those of embodiment 1.

Next, on the mobile communication device 101, when a communication request to the external network 104 is generated, the higher-layer processing section 204 searches for a significance parameter corresponding to a service for communication in the service-type recording section 205, and decides an interface candidate for use from the information stored in the interface recording section 206 and the matrix information stored in the interface-candidate selecting section 111 (step S2904).

The network controller 203 of the mobile communication device 101, after determining an interface for use, generates an interface-candidate notification message 1401 storing its own identifier 1301 and one or a plurality of interface-for-use types 1302 as candidates, and sends it to the mobile router through the common wireless interface 201 (step S2905).

The mobile router 102 checks for reception of an interface-candidate notification message 1401 from the mobile communication device 101 (step S3003). When receiving an interface-candidate notification message 1401, extracted from this are an identifier 1301 of the mobile communication device 101 and an interface type 1302 as a candidate for use, and those are recorded in the connection-interface decision section 121 (step S3004). The connection-interface decision section 121 decides an interface for use from the candidate interfaces, on the basis of the recorded interface type 1302 and the information of the interface from the data-link control section 708 (step S3005).

From then on, the interface designated is used in communication between the mobile communication device 101 and the external network 104 (step S2906, S3006).

Next, the external-link monitor section 709 of the mobile router 102 checks for abnormality of the interface connected from the data-link control section 708 (step S3007). When detecting an abnormality, the external-link monitor section 709 notifies it to the network controller 703. The network controller 703 updates the information of within the interface recording section 705 and makes a notification to the connection-interface section 121. The process returns to step S3005. At the step S3005, the notified connection-interface decision section 121 selects one other than the interface detected of link abnormality from the interface candidate table. When there is no candidate interface, the process returns to the step S2802, to notify information about new interface to the mobile communication device 101 (step S3009). In the case of no abnormality detection, check is made whether communication ends or not (step S3008). Abnormality detection is continued up to the end of communication.

Meanwhile, the mobile communication device 101, after the start of communication, returns to the step S2701. When receiving an interface-information notification 1001 from the mobile router 102, carries out is a process of from step S2702 to step S2906, to make a switchover to a new interface thereby continuing communication. However, communication is continued without any notification as long as the mobile router 102 is allowed to make a selection from the interface candidate table.

As described above, this embodiment obtains the similar effect to that of embodiment 1. Besides, even in the event of an abnormality occurs in the external network, the mobile router making a switchover to another interface of among candidate interfaces to thereby continue communication. Thus, the mobile communication device is allowed to continue communication without paying any attention. Meanwhile, where no candidate interface is available, new interface information is voluntarily notified to the mobile communication device similarly to embodiment 1. Therefore, there is no need for the mobile communication unit to frequently inquire about interface information to the mobile router, making it possible to avoid congestion over the line between the mobile communication unit and the mobile router.

Embodiment 3

Figure 25C:
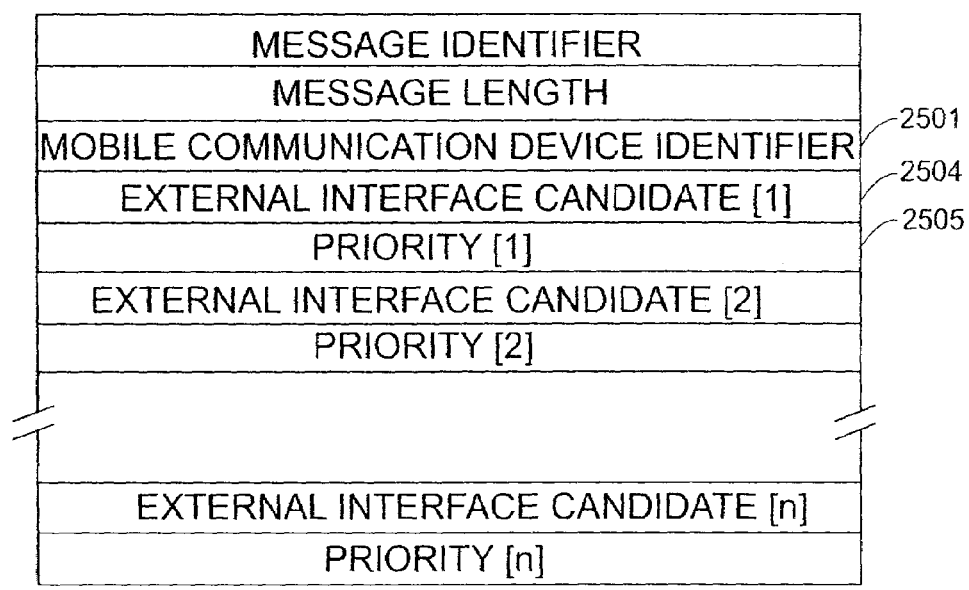
FIG. 25C is a figure showing a configuration of interface candidates to be generated by the mobile communication device according to embodiment 3 of the invention.

In embodiment 3, the mobile communication device 101, the mobile router 102 and the mobile communication system 105 have the same configuration as those of embodiment 2. The interface-candidate selecting section 111 of the mobile communication device 101 in this embodiment selects first, second and third candidates in a rank of higher score, on the basis of the score calculated in embodiment 2. The network controller 203 puts the interface candidate with a priority as shown in FIG. 25C and stores it in an interface-candidate notification message, thereby sending it to the mobile router 102 through the common wireless interface 201. Here, W-CDMA is the first candidate and IEEE802.11a is the second candidate. In FIG. 25C, its own identification code is set to mobile communication device identifier 2501, an external interface type selected as a candidate is set to external interface candidate 2504, and a selected order of the external interface is set to priority 2505.

Figures 15, 16:
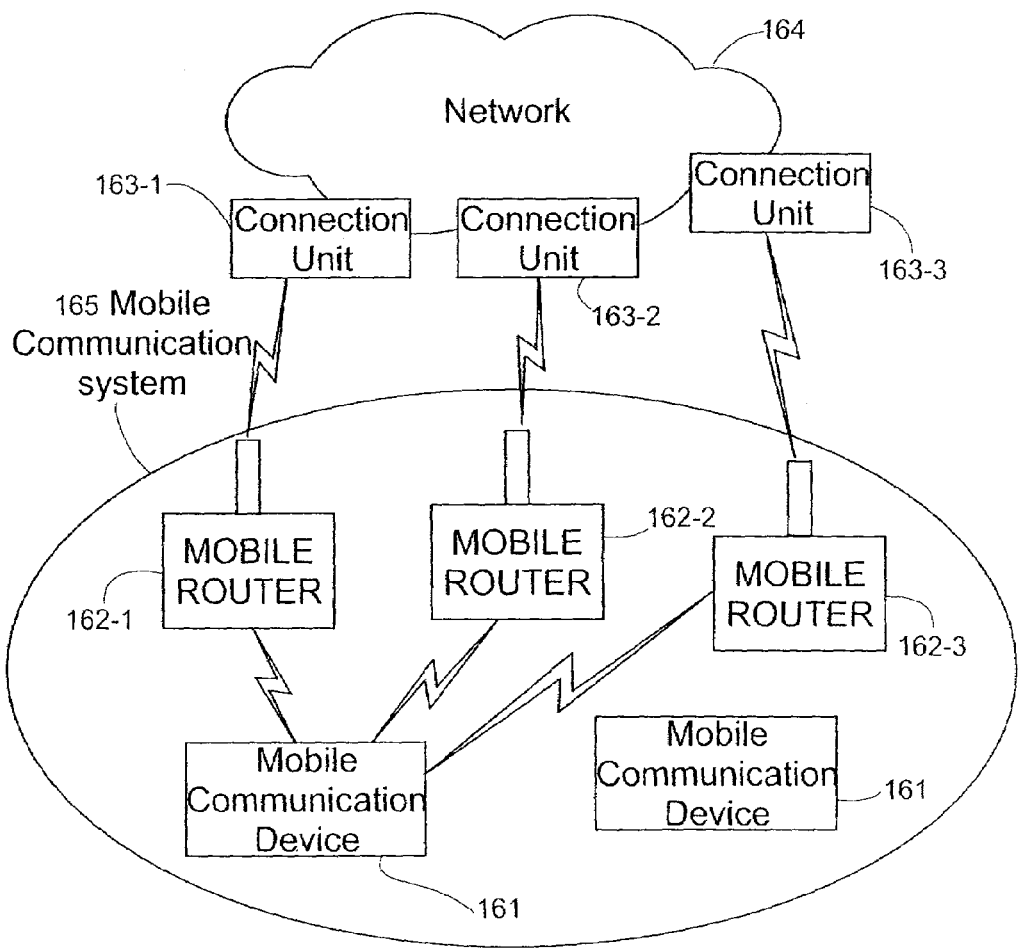
FIG. 15 is a figure showing an example of an interface candidate table in a connection-interface decision section of a mobile router according to embodiment 3 of the invention.
FIG. 16 is a diagram showing a configuration of a mobile communication system according to embodiment 4 of the invention.

The network controller 703 of the mobile router 102 received the interface-candidate notification message 1001 records the mobile communication device identifier 1501, the candidate interface type 1502 and the priority 1503 to the interface-candidate table shown in FIG. 15 of the connection-interface decision section 121.

Meanwhile, the connection-interface decision section 121, at a process of step S3005 in FIG. 30, makes a decision as to whether connectable or not in the higher rank shown in the interface-candidate table from beacon signal reception and reception power information of the interface, thereby using an interface decided connectable.

In the case the external-link monitor section 709 of the mobile router 102 detects an abnormality in communication with the external network, the connection-interface decision section 121 selects the next rank to the interface caused abnormality from the priority 1503 of the interface-candidate table. When there is no candidate interface, the process returns to the step S2801, to notify new interface information to the mobile communication device 101. From then on, the process is the same as that of embodiment 2.

As described above, in the present embodiment, the mobile communication device is allowed to designate a priority in selecting an interface for connection thus realizing interface selection under the initiative of the mobile communication device, in addition to the effect of embodiment 2. Even in the event of an abnormality occurs on the interface, the mobile router makes a selection in an optimal conditional order, enabling to continue communication.

Embodiment 4

FIG. 16 is a figure showing a concept that a mobile communication system 165, comprised of mobile communication devices 161 and mobile routers 165, is to connect with a network. The mobile router 162 of this embodiment is different from the mobile router 102 shown in embodiment 1 in that it has only one interface for connection with a connection device 163 provided within the external network 164. In the mobile communication system of this embodiment, the mobile routers 162-1 to 162-3 respectively have different interfaces. The connection units 163-1 to 163-3 are the same as those of embodiment 1.

Figures 17, 18:
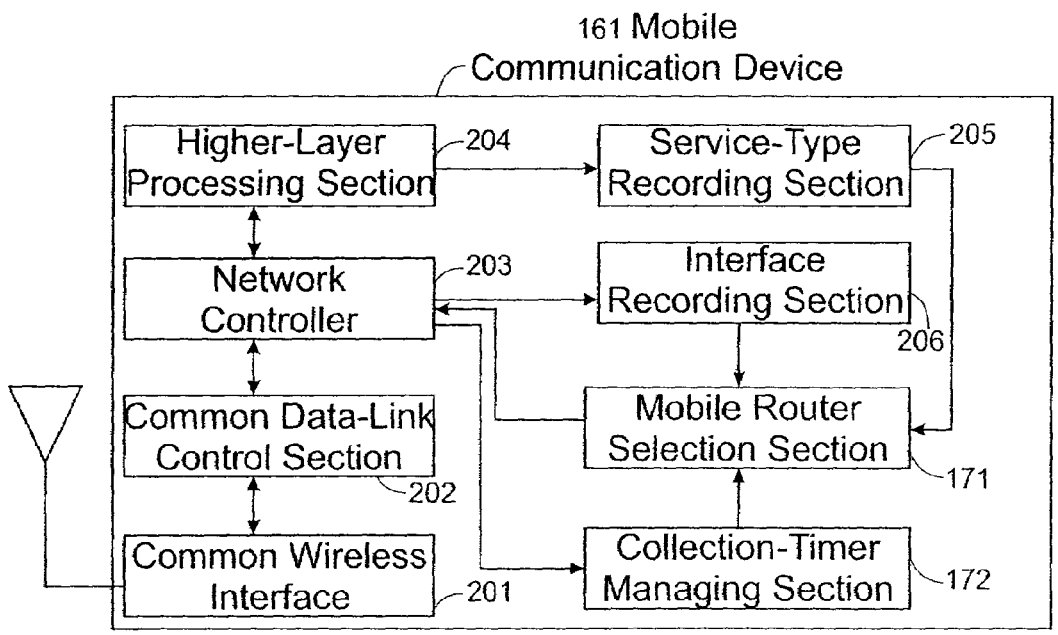
FIG. 17 is a block diagram showing a configuration of a mobile communication device according to embodiment 4 of the invention.
FIG. 18 is a figure showing an example of an interface recording section of a mobile communication device according to embodiment 4 of the invention.

FIG. 17 is a block diagram showing a configuration of the mobile communication device 161 of the invention.

The mobile communication device 161 has an interface recording section 206 recording the information shown in FIG. 18 in its memory.

In FIG. 18, the mobile router 162-1 having a communication device identifier 1801 of 3ffe:501::100:204:b1ff:fe98:3ed in IPv6 global address possesses an interface type 1802 of IEEE802.11a. The mobile router 162-2 having a communication unit identifier 1801 of 3ffe:501:221:10:312:26ff:fe14:2805 possesses an interface type 1802 of W-CDMA. The mobile router 162-3 having a communication unit identifier 1801 of 3ffe:501:5:187:104:eeff:fe31:7729 possesses an interface type 1802 of PDC. Those are each shown in a connectable state.

Incidentally, the priority field 1804 is provided depending upon the selection process by the mobile router selecting section 171. The provision of these fields makes it possible to grasp an external interface type 1802 in each mobile router 162 existing within the mobile communication system 165.

The mobile router selecting section 171 carries out a processing to decide an interface candidate for use in communication between the present mobile communication device 161 and the external network 164 from the information stored in the service-type recording section 205 and interface recording section 206, to thereby select a mobile router 162 having that interface. Incidentally, the mobile router 171, storing a matrix information for selecting at least one interface, decides an interface according to the information. Incidentally, how to decide an interface candidate is the same as that of embodiment 2.

The network controller 203 carries out a process to exchange data with the higher-layer processing section 204 and the common data-link control section 202, a process to generate, as required, a message requesting for the interface information the mobile router 162 possesses, and a process to obtain the interface information the mobile router 162 possesses and deliver it to the interface recording section 206, similarly to embodiment 2. Furthermore, the network controller 203 generates an interface-candidate message storing, in pair, a selectable interface type 1802, an identifier 1801 of a mobile router possessing that interface, a priority 1804 thereof and a link status 1803.

A collection-timer managing section 172 is to manage a collection timer for regulating a period for which interface information is gathered from the mobile router 162 and a confirmation timer for starting up a resend process of an interface-candidate selection message.

Figures 19, 20:
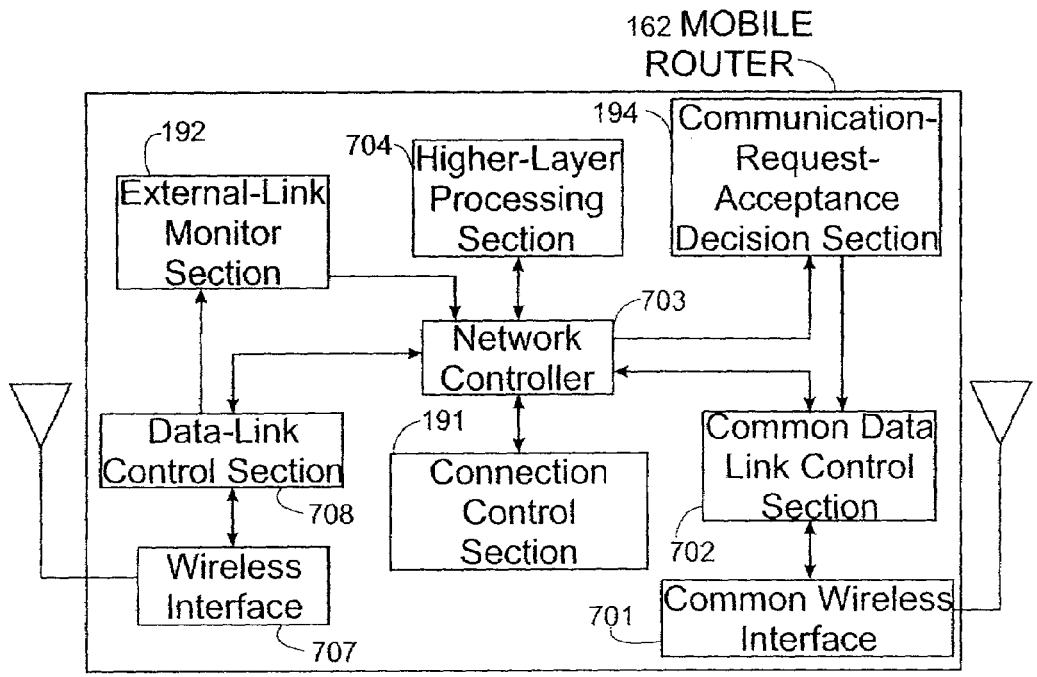
FIG. 19 is a block diagram showing a mobile router according to embodiment 4 of the invention.
FIG. 20 is a figure showing an example of a connection permission table in a connection control section of a mobile router according to embodiment 4 of the invention.

FIG. 19 is a block diagram showing a configuration of the mobile router 162 of the invention. The data-link control section 708 and wireless interface 707 have a function different between the mobile routers. For example, in FIG. 16, the mobile router 162-1 has a function of IEEE802.11, the mobile router 162-2 of W-CDMA, and the mobile router 162-3 of PCD.

A connection control section 191 receives an interface-designation notification message from the mobile communication device 161. From the information contained in the message, it generates and records a mobile communication device identifier 2001, a type 2003 of interface to be selected by the mobile communication device represented by the identifier, an identifier 2002 of a mobile router possessing that interface, a link status 2004 and a connection permission table representative of a priority 2005.

Figures 40, 41:
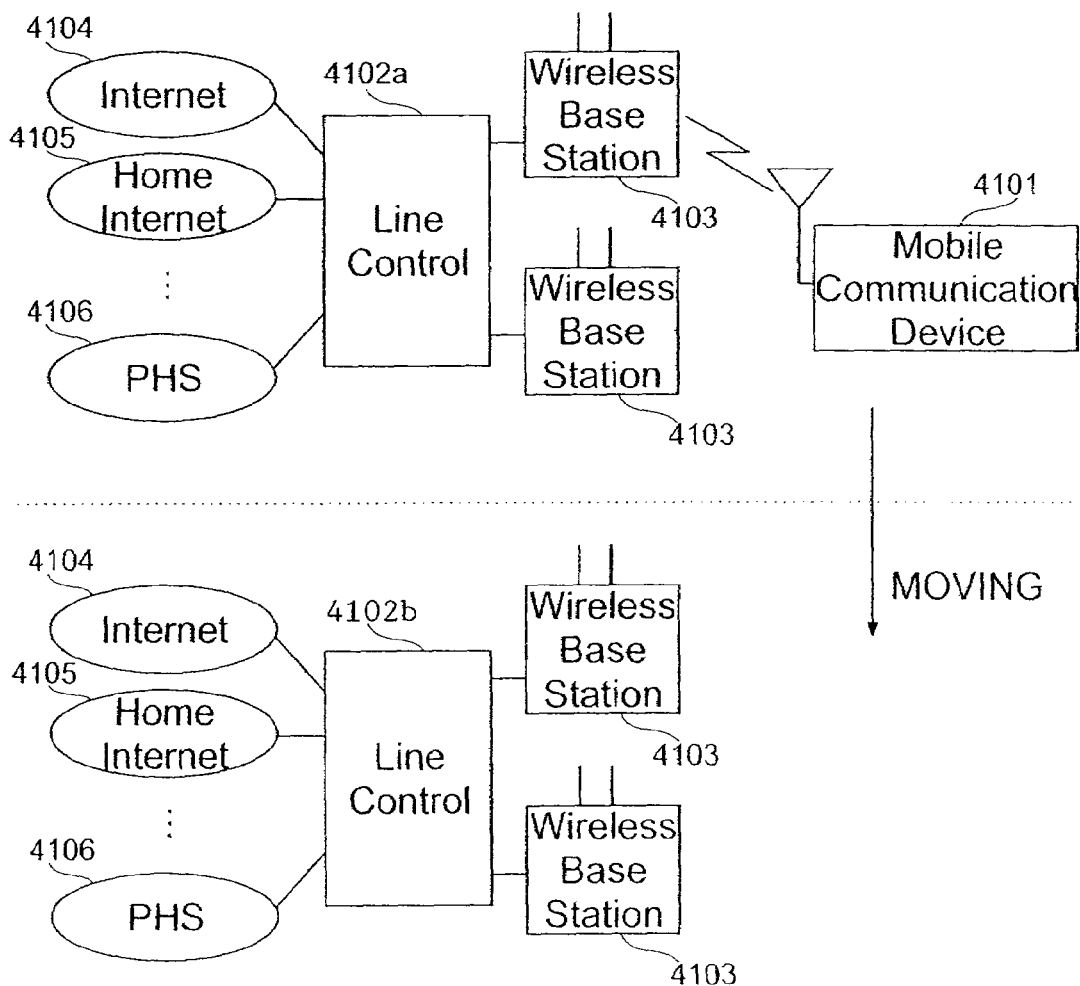
FIG. 40 is a figure showing a link status table in an external-link monitor section of the mobile router according to embodiment 4 of the invention.
FIG. 41 is a configuration diagram showing a mobile communication system in the prior art.
Figure 42:
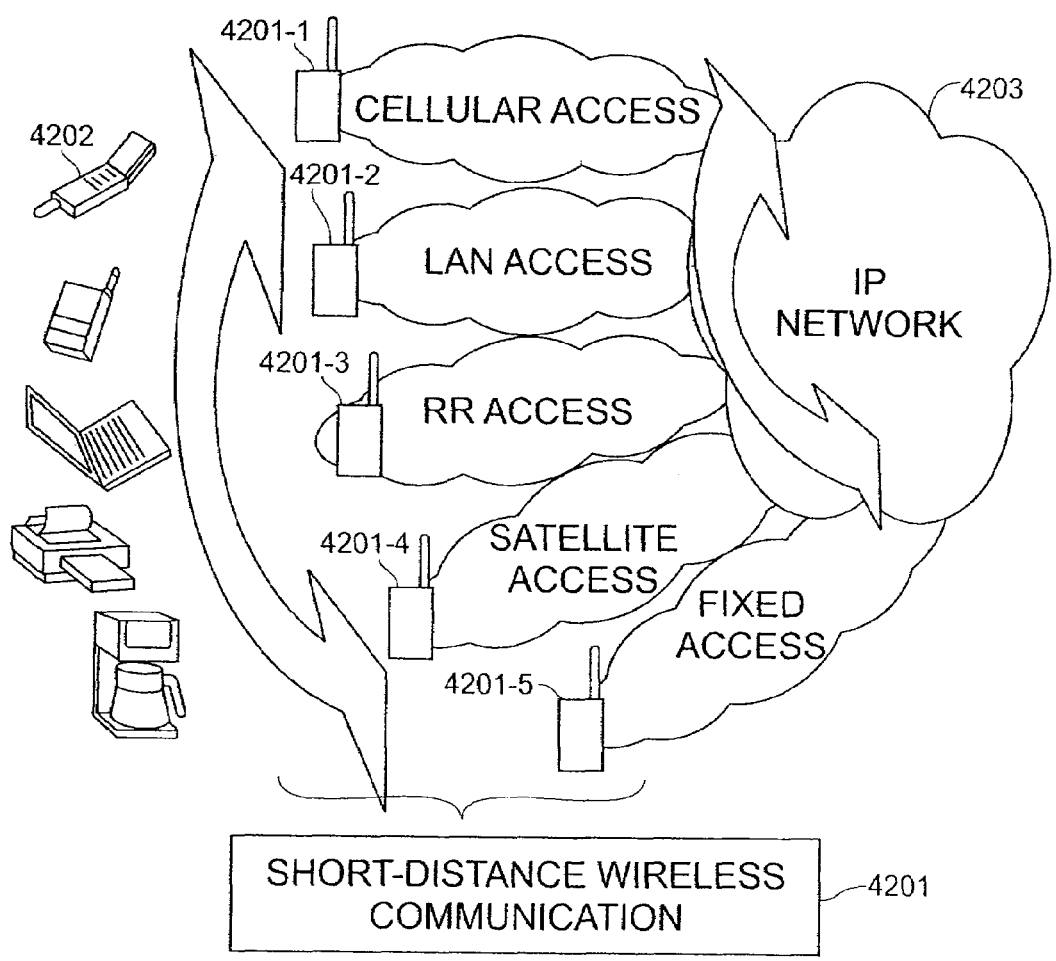
FIG. 42 is a configuration diagram showing a mobile communication system in the prior art.

An external-link monitor section 192 has a function to examine for connection status with the external network 164. The reception power level information, error rate and presence/nascence of beacon signal reception of a signal received at the wireless interface 707 is delivered from the data-link control section 708 to the external-link monitor section 192. The external-link monitor section 192 has a link status table as shown in FIG. 40, storing therein an external interface type 4001 and a link status 4002 thereof. The external-link monitor section 192 can receive a particular signal, such as a beacon signal, from the information of from the data-link control section 708. When error rate is within a permissible range and reception level is sufficiently high, it decides that connection is possible to the external network 164. In the link status table, link status 4002 is set to "connected". The external-link monitor section 192, when external-link status is changed, i.e. when link status table is changed from connection to non-connection or from non-connection to connection, delivers an external link change and post-change status to the network controller 703, thus instructing to generate an interface-information notification message. This process is carried out at all times.

A network controller section 703 analyzes the interface-designation notification message received from the mobile communication device 161 and makes a processing to record information to the connection control section 191. Meanwhile, instructed by the external-link monitor section 192, it makes a processing to generate an interface-information notification message and send it by storing an interface type 2003 possessed by it own, mobile router identifier 2002 and link status 2004 to the mobile communication devices 161 under the dominance of the relevant unit. When receiving a connection-request confirmation message generating request from the connection control section 191, looked up is a link status table of the external-link monitor section 192. In a case the link status 2004 is in connection, transmission process is done by generating a connection request confirmation message containing its own identifier 2002 and interface type 2003. Besides, data exchange process is carried out with the higher-layer processing section 704, the common data-link control section 702 and the data-link control section 708.

A communication-request acceptance decision section 194 is to determine whether or not a communication request or data is received at the interface selected by the relevant mobile communication device 161 when receiving a communication request or data from the external network 164 to the mobile communication device 161. In the case of an interface selected by the mobile communication device 161, the network controller 703 is instructed to instruct to transfer the communication request or data to the mobile communication device.

The other constituent elements than those are the same as those of embodiment 2.

Figure 21:
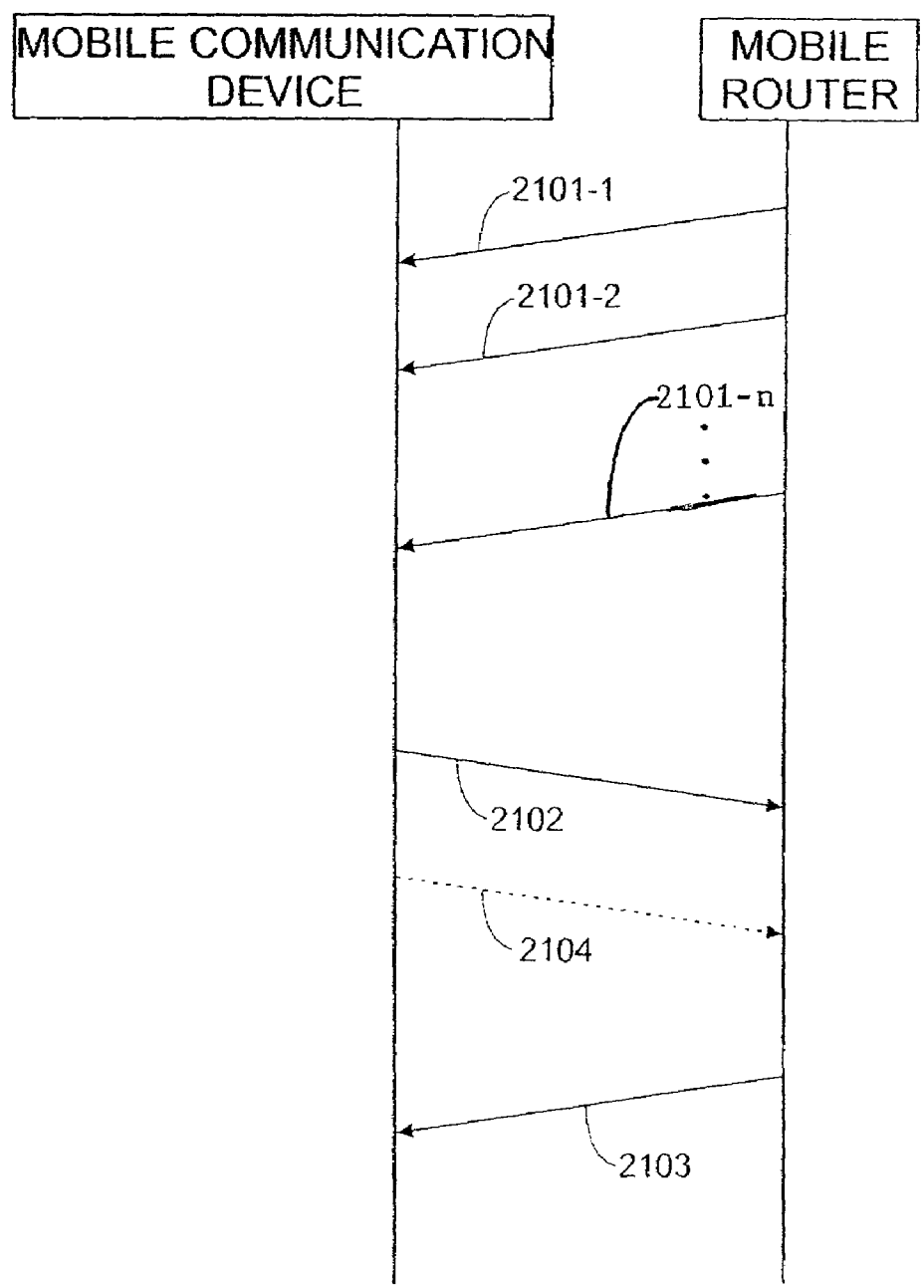
FIG. 21 is a sequence chart of up to a decision of an external interface to be connected by the mobile communication device according to embodiment 4 of the invention.
Figure 31:
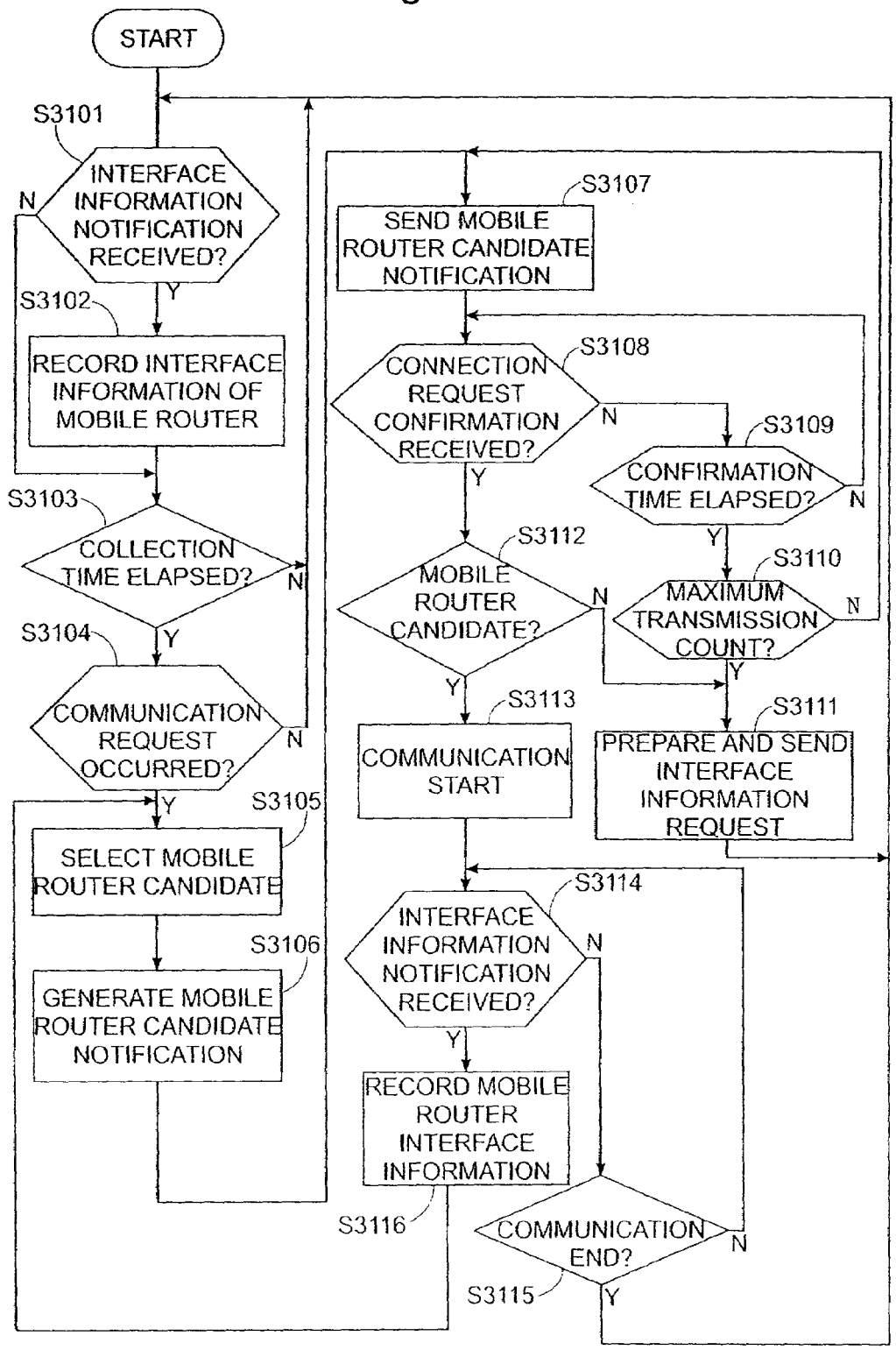
FIG. 31 is a flowchart showing an operation of the mobile communication device according to embodiment 4 of the invention.
Figure 32:
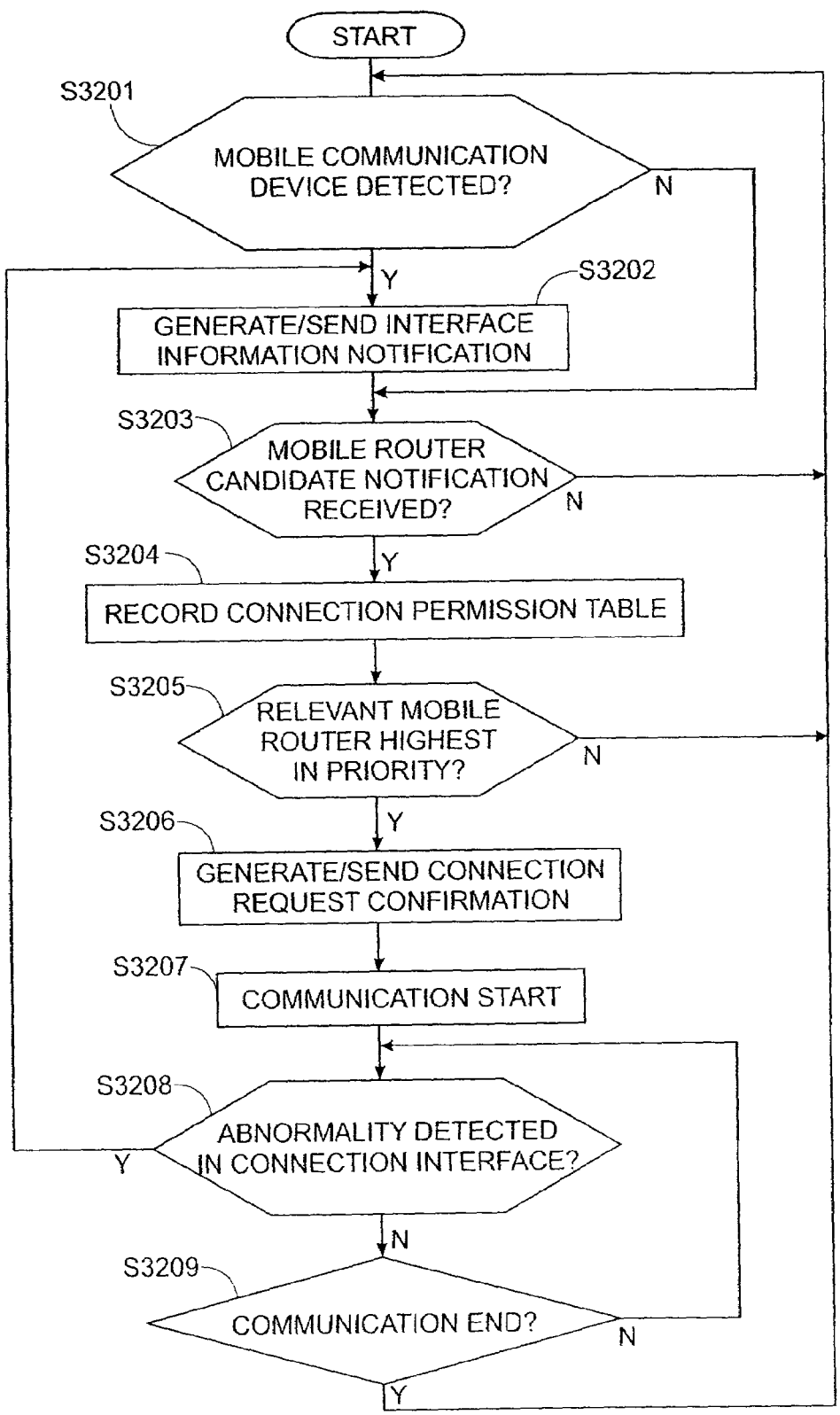
FIG. 32 is a flowchart showing an operation of the mobile router according to embodiment 4 of the invention.

FIG. 21 shows a sequence of up to determining an interface of the mobile router 162 for the mobile communication device 161 to connect with the external network 164. FIG. 31 is a flowchart showing an operation of the mobile communication device 161, showing a process of from starting, to an end, of communication with the external network after connected and become under the dominance of the mobile router 162. FIG. 32 is a flowchart showing an operation of the mobile router 162, showing a process of from a start, after detecting a mobile communication device 161, to an end of relaying a message of from the mobile communication device 161.

At first, the mobile router 162, if detecting a new entry of mobile communication device 161 (step S3201), prepares an interface-information notification message 2101-1 to 2101-n and sends it to the mobile communication device 161 (step S3202). The interface-information notification message is sent from a plurality of mobile routers 162 of within the mobile communication system 165.

Meanwhile, when the newly entered mobile communication device 161 is placed into connection with the mobile communication device 165, the collection-timer managing section 172 thereof sets a collection timer and waits for an interface-information communication message for a constant period (step S3101).

The network controller 203 of the mobile communication device 161, when receiving an interface-information notification message, stores an interface type 2003, mobile router identifier 2002, and link status 2004 stored therein to an interfaced recording section 206 (step S3102). It waits for an interface-information notification message from other mobile routers 162 until elapsing the collection time (step S3103).

Thereafter, when the collection time is elapsed, the higher-layer processing section 204 of the mobile communication device 161 checks for generation of a communication request to the external network (step S3104). In the case of a generation, the higher-layer processing section 204 searches in the service-type recording section 205 for a significance parameter corresponding to a service for communication, and determines an interface candidate for use from the information stored in the interface recording section 206 and the matrix information stored in the mobile-router selecting section 171 (step S3105).

The network controller 203 of the mobile communication device 161, after deciding an interface candidate for use, generates an interface-candidate notification message 2102 storing its own identifier 2001, a candidate interface type 2003 for use, a priority 2005 thereof and a link status 2004 (step S3106), and sends it to the mobile router 162 (step S3107). At this time, set is the confirmation timer as permission time for receiving a connection-request confirmation message from the mobile router 162.

Figure 26A:
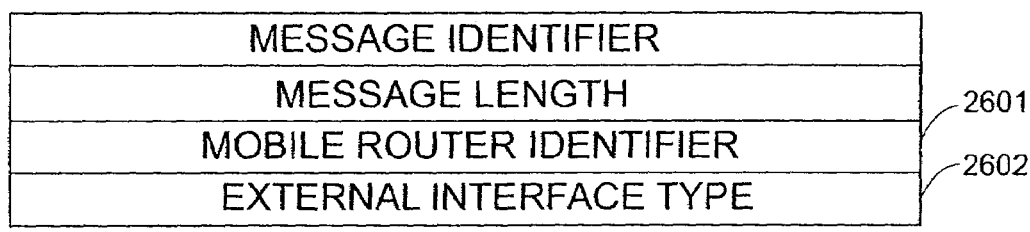
FIG. 26A is a figure showing a configuration of connection-request confirmation to be generated by the mobile router according to embodiment 4 of the invention.

Meanwhile, the network controller 703 of the mobile router 162 checks for reception of an interface-candidate notification message 2102 from the mobile communication device 161 (step S3203). When receiving the message, the network controller 703 extracts, from the interface-candidate notification message 2102, the identifier 2001 of the mobile communication device 161, the candidate interface type 2003 for use, the priority 2005 and the link state 2004, and records those to the connection-permission table of the connection control section 191 (step S3204). The connection control section 191 of the mobile router 162 searches for the connection permission table and determines whether or not the identifier of the mobile router 162 which is in connection status and has the highest rank agrees with its own identifier and the external link is in a connection status (step S3205). The connection control section 191, when satisfying this condition, regards itself as selected and generates and sends a connection-request confirmation message 2103 as shown in FIG. 26A (step S3206). When the condition is not satisfied, the process returns to the step S3201. Incidentally, in the mobile router identifier 2601 of the connection-request confirmation message, its own identifier is set. In the external interface type 2602, set is an external interface type for use.

The network controller 203 of the mobile communication device 161 checks for reception of a connection-request confirmation message 2103 (step S3108). If not received, check is made for a lapse of confirmation time (step S3109). If the confirmation time is not elapsed, the process returns to the step S3108. When it is elapsed, check is made for whether or not the number of transmission times of interface-candidate notification messages 2102 reaches a predetermined count (step S3110). In the case of not reaching the count, "1" is added to a counter of transmission count, and then the process returns to the step S3107. In the case the transmission count is reached, an interface-information request message is generated and multicast to the mobile router 162 (step S3111).

In the case the connection-request confirmation 2103 is received at step S3108, the received identifier of mobile router 162 is checked, to check for whether it is a selected mobile router candidate or not (step S3112). In the case it is not one of the candidates, the process moves to step S3111. In the case it is a candidate, connection is established to this mobile router 162 thus carrying out communication (step S3113, S3207).

Figure 22A:
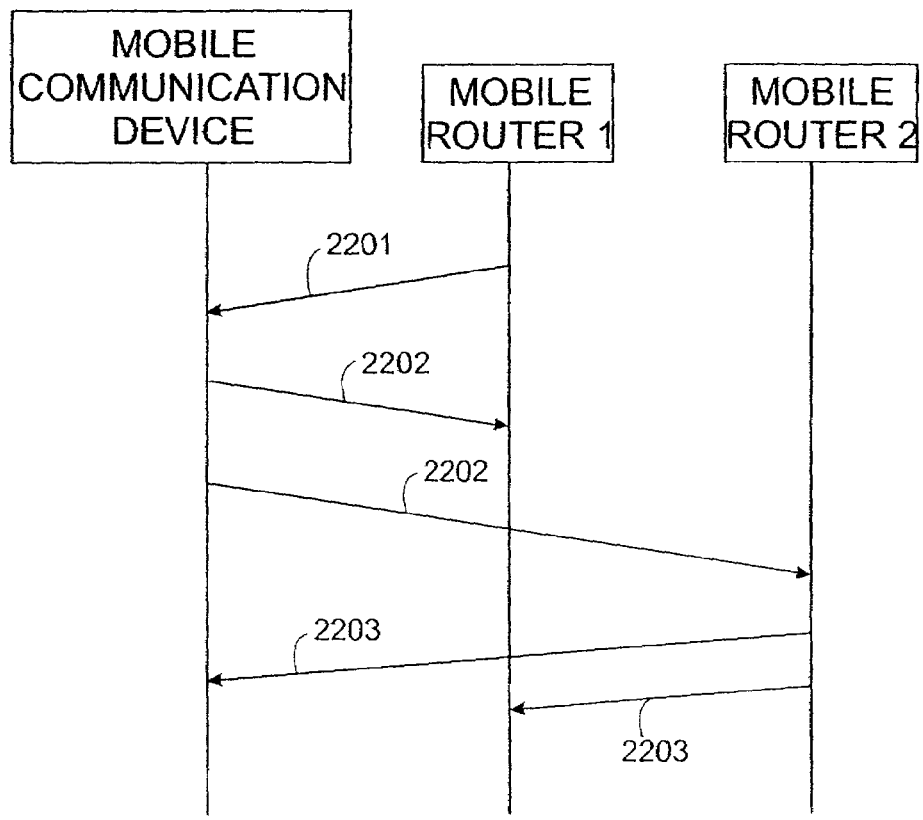
FIG. 22A is a sequence chart showing an operation to switch the external interface to be connected by the mobile communication device according to embodiment 4 of the invention.

Next explained is the operation of up to switching over the interface of the mobile router 162 for connecting the mobile communication device 161 to the external network 164, from a mobile router (1) 162 to a mobile router (2) 162. FIG. 22A shows a sequence of the operation.

The external-link monitor section 192 of the mobile router (1) 162, currently in connection with the external network 164, checks for change in external link status (step S3208). If detecting an abnormality, it is notified to the network controller 703. The network controller 703 updates information into non-connection of the interface with the external network that service is offered by itself. Then, the process returns to the step S3202. Due to this, the network controller 703 prepares an interface-information notification message 2201 notifying the fact of being in a non-connection status and sends it to the mobile communication device 161 (step S3202).

The network controller 203 of the mobile communication device 161 checks for reception of an interface-information notification message 2201 (step S3114). If not received, check is repeated up to the end of communication (step S3115). If received, the interface type 2003, mobile router identifier 2002 and link status 2004 stored therein is stored to the interface recording section 206 (step S3116). Thereafter, the process returns to the step S3105, to search in the service-type recording section 205 for a significance parameter corresponding to the service for communication. An interface candidate for use is determined from the information stored in the interface recording section 206 and the matrix information stored in the mobile-router selecting section 171 (step S3105). The mobile communication device 161, this time, is to decide a mobile router (2) to the highest rank of interface candidate for use.

The mobile router (2) 162, when received an interface-candidate notification message 2202 from the mobile communication device 161 (step S3203), extracts the identifier 2001 of the mobile communication device 161, interface type 2003, priority 2005 and link status 2004 from the interface-candidate notification message 2202, and records it to the connection permission table of the connection control section 191 (step S3204).

The mobile router (2) 612, this time, decides as itself the identifier 2002 of the highest priority of mobile router 162 in a connectable status and multicasts a connection-request confirmation message 2203 (step S3206).

The mobile communication device 161, when receiving the connection-request confirmation message 2203 (step S3108), checks for transmission source (step S3112) and authorizes it because the transmission source is the mobile router (2). Then, connection is established to implement communication (step S3113).

Now explained is the operation of returning the connection from the mobile communication device 161 in the case of restoration of the connection interface of the mobile router 162.

Figure 22B:
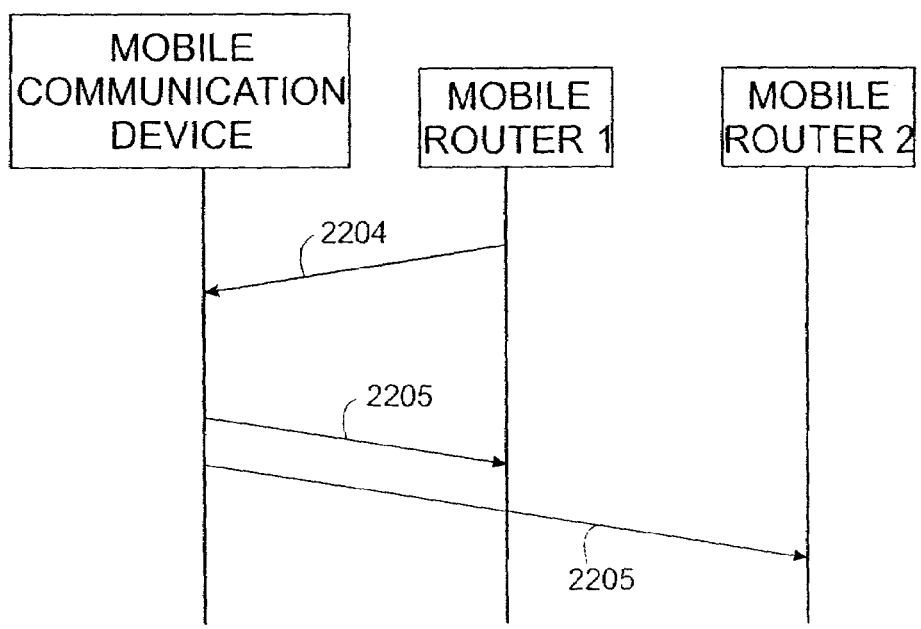
FIG. 22B is a sequence chart showing an operation to return back the external interface to be connected by the mobile communication device according to embodiment 4 of the invention.
Figure 33:
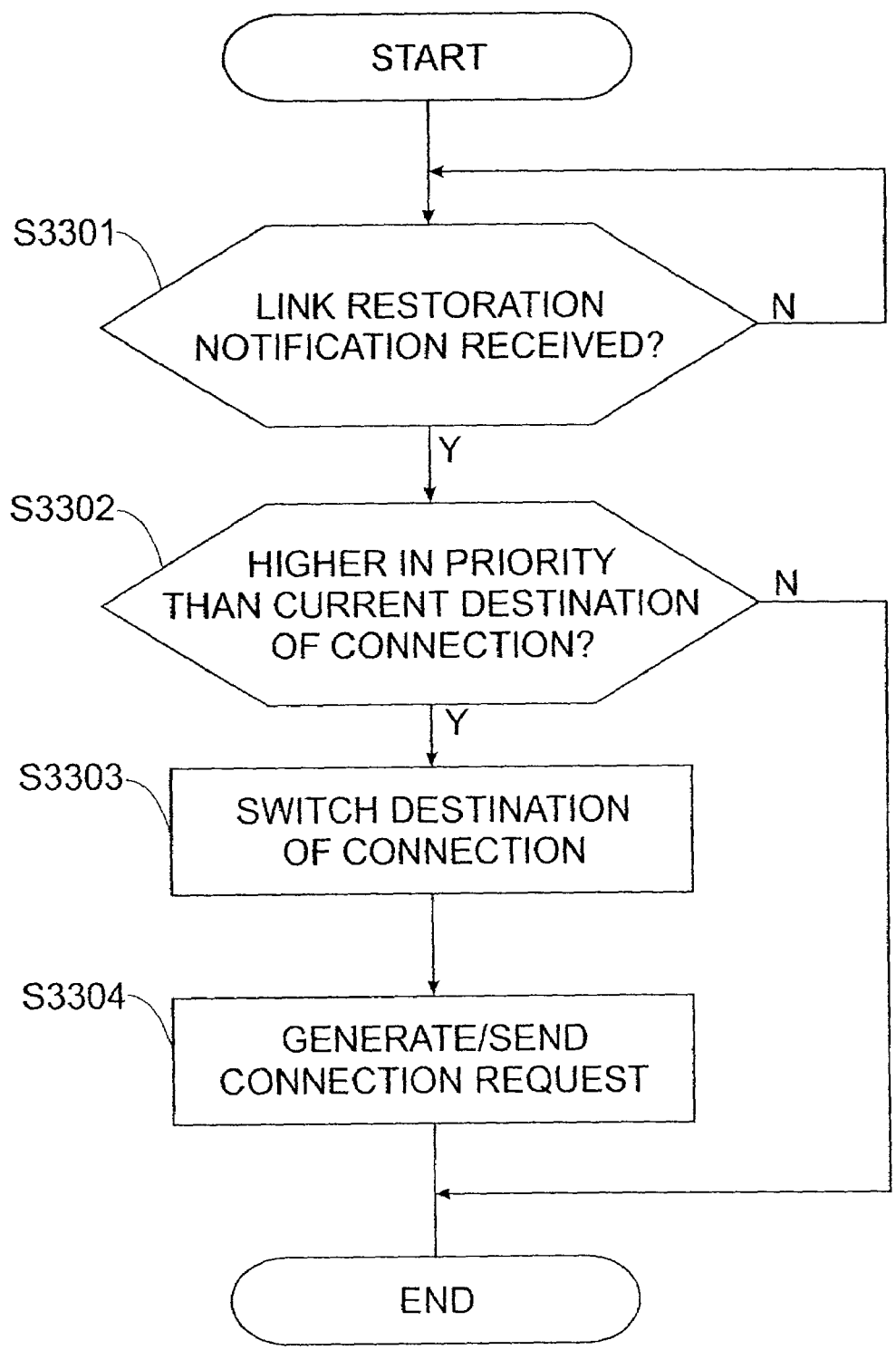
FIG. 33 is a flowchart showing a restoration operation of the mobile communication device according to embodiment 4 of the invention.
Figure 34:
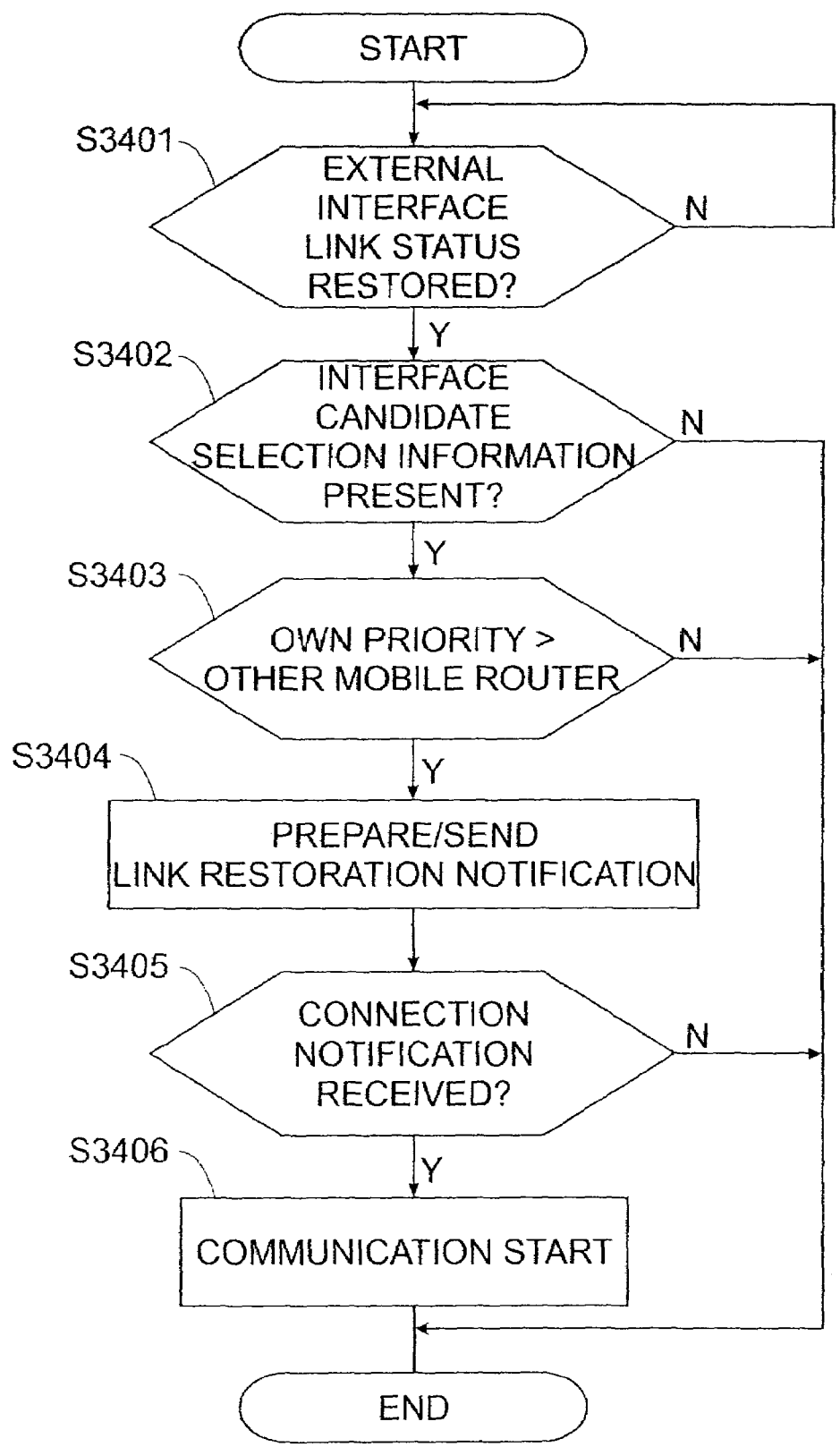
FIG. 34 is a flowchart showing a restoration operation of the mobile router according to embodiment 4 of the invention.

FIG. 22B shows a sequence of the operation. FIG. 33 is a flowchart showing an operation on the sequence of the mobile communication device 161 while FIG. 34 shows a flowchart on the mobile router 162.

The external-link monitor section 192 of the mobile router (1) 162 checks for change in external link status (step S3401). If a restoration is detected, it is notified to the network controller 703. The network controller 703 updates information into connection status of the interface to the external network. The network controller 703 checks for whether or not its own identifier has been selected in the connection permission table stored in the connection control section 191, from the interface-candidate notification message received from each mobile communication device 161 (step S3402). If its own identifier is not found in the candidates, the process is ended. If its own identifier is found in the candidates, comparison is made in priority with the mobile router currently in connection status (step S3403). The fact the mobile router 162 currently in connection is the mobile router (2) can be known from multicasting of a connection-request confirmation message by the mobile router (2) during switching from the former mobile router (1) to the mobile router (2).

Next, the connection control section 191, when deciding that its own priority is higher than that of the mobile router (2) currently in connection, notifies it to the network controller 703. The network controller 703 prepares a link-restoration notification message 2204 notifying a fact of restoration of the link to the external network and sends it to the mobile communication device 161 (step S3404).

The network controller 203 of the mobile communication device 161, during communication, always checks for reception of a restoration notification message 2204 (step S3301). If receiving it, the mobile router selecting section 171 checks for whether or not the mobile router as a transmission source of the restoration notification message 2204 is higher in priority than the mobile router currently in connection (step S3302). When lower in priority, the process is ended. However, when higher, the default router in the routing table is switched to the mobile router as a transmission source of the restoration notification message (step S3303).

Next, the network controller 203 of the mobile communication device 161 generates a connection-request message 2205 notifying a connection request set with an identifier of the mobile router (2) as a destination of connection, thereby multicasting it (step S3304).

The network controller 703 of the mobile router (2) checks the connection-request message 2205 (step S3405). If the identifier is of its own, it starts communication with the mobile communication device 161 as a transmission source (step S3406). Meanwhile, the network controller 703 of the mobile router (1), when detecting that its own identifier is not set in the connection-request message, terminates the relay so far with the mobile communication device 161.

Incidentally, the mobile communication device 161, when receiving a restoration notification from the mobile router (1), is allowed not to make the above destination-of-transfer switchover in the case the current remaining amount of communication is less than a predetermined amount according to the information received from the higher-layer processing section 204.

As described above, in the present embodiment, when the mobile communication device not having means for direct communication with an external network makes communication with an external network by way of a plurality of mobile routers having interfaces to the external network, it selects with priority a mobile router for relaying over to the external network according to a characteristic of a service to be handled by the mobile communication device, thereby making a notification to the mobile router. Due to this, the mobile communication device is allowed to designate an optimal interface group for service. Meanwhile, even in the case that there is a need to carry out communication through a new separate interface due to a movement of communication area, prevented is communication through an interface not satisfying the characteristic. This can prevent against the fear that a third party get information as concerned by switching over of the interface, the fear to deteriorate the quality of communication data and the fear to interfere with communication of other mobile communication device.

Meanwhile, by allowing the mobile communication device to designate a priority in selecting an interface for connection, it is possible to realize interface selection under the initiative of the mobile communication device.

Furthermore, in the event of an abnormality occurring on the external interface offering service of the mobile router, swift switchover can be made to the next priority of mobile router. Furthermore, where abnormality occurs earlier in the external interface and then the mobile router interrupted of connection is restored, connection can be regained. Therefore, among the communication environments available at all times, it is possible to use a mobile router having an external interface best suited for communication.

Incidentally, in the present embodiment, the mobile router at step S3403 decided whether or not its own priority is higher than that of the mobile router currently in connection status. However, this is not limitative, i.e. it can check for whether or not its own priority is the lowest whereby, when not the lowest, a link-restoration message can be multicast. This allows switchover operation without knowing a connection status of other mobile routers.

Figure 35:
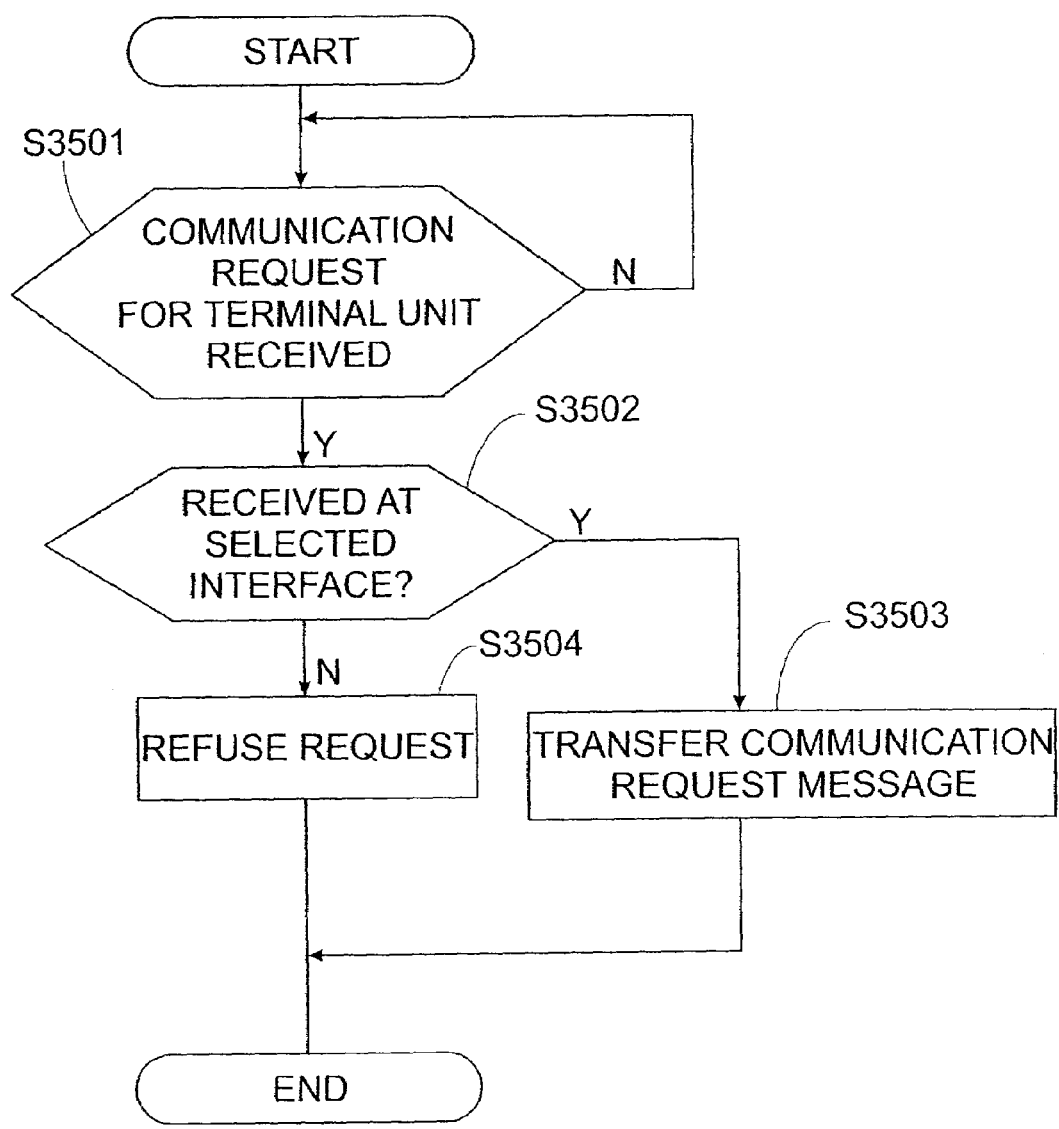
FIG. 35 is a flowchart showing a reception operation from an external network of the mobile router according to embodiment 4 of the invention.

Now explained is the operation of the mobile router in the case of relaying from the external network to the mobile communication device 161. FIG. 35 is a flowchart explaining an operation of the mobile router.

At first, the network controller 703 checks for reception of a message destined to the mobile communication device 161 from the external network (step S3501). This is repeated up to its reception.

In the case of reception, the communication-request acceptance decision section 194 decides whether or not the communication request is received at the interface selected by the mobile communication device 162 as a destination of transmission (step S3502).

In the case of a selected interface, the communication-request acceptance decision section 194 instructs the network controller 703 to instruct a transfer to the mobile communication device designated for a communication request. According to the instruction, the network controller 703 transfers the data received (step S3503). In the case of not a selected interface, the communication-request acceptance decision section 194 instructs to the network controller 703 to refuse the request, thus sending an answer of request refusal to the external network.

This allows the mobile communication device to always communicate through the selected external interface, thus enabling communication both in transmission and reception through the optimal interface.

Embodiment 5

Figure 36:
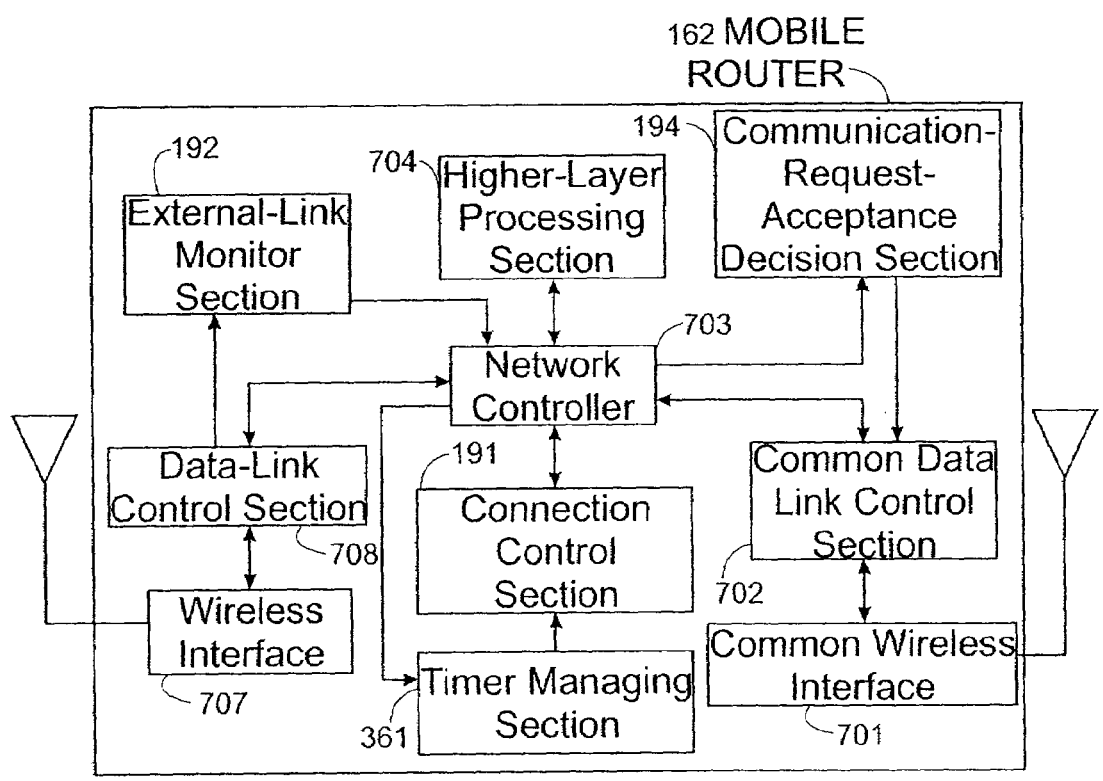
FIG. 36 is a block diagram showing a configuration of the mobile router according to embodiment 5 of the invention.

FIG. 36 is a diagram showing a configuration of the mobile router in the present embodiment. This is different from the mobile router shown in embodiment 4 in that having a timer managing section 361. Besides this, the mobile communication device, the mobile communication system and the external network have configurations similar to those of embodiment 4.

In FIG. 36, the timer managing section 193 is to manage a timer regulating the transmission timing of a connection-request confirmation message in the case of receiving an interface-candidate selection message by multicast from the mobile communication device 161 or another mobile router 162.

Figure 37:
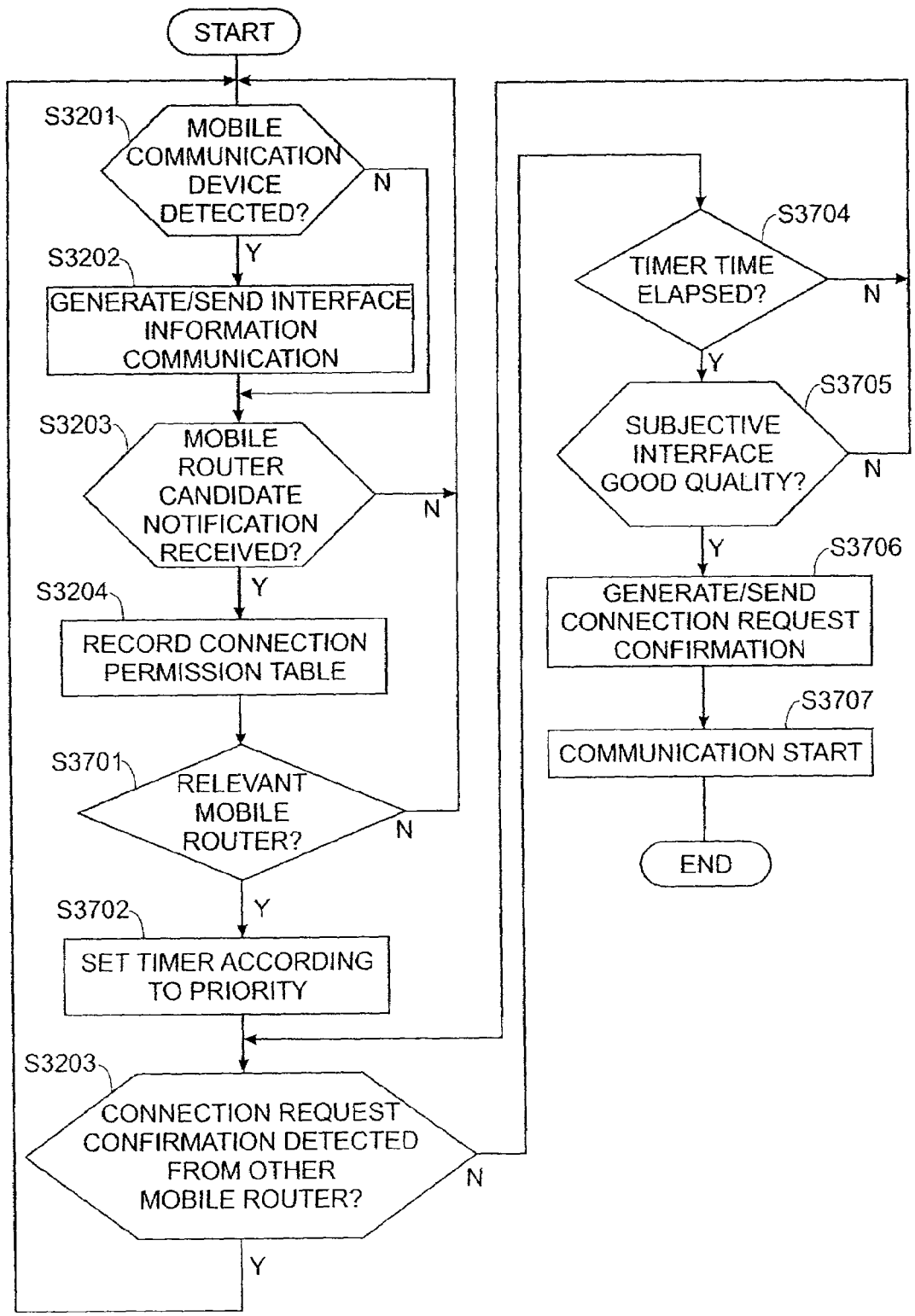
FIG. 37 is a flowchart showing an operation of the mobile router according to embodiment 5 of the invention.

Now explained is the operation of up to a start of communication by deciding a mobile router 162 for connection of the mobile communication device 161 to the external network 164. FIG. 37 is a flowchart showing an operation of the mobile router 162. Incidentally, the operation of the mobile communication device 161 of from a reception process of an interface-information notification up to a communication start is the same as that of from step S3101 to step S3113 of embodiment 4 shown in FIG. 31.

At first, the mobile router 162 detects a new entry of mobile communication device 161. The process of this step S3201 to a step S3204 of recording to the connection permission table of the connection control section 191 is the same as the process as shown in embodiment 4.

Next, the connection control section 191 of the mobile router 162 searches for the connection permission table and determines whether or not the identifier of a candidate mobile router 162 agrees with its own identifier (step S3701). The connection control section 191, when this condition is satisfied, sets a time previously determined based on priority to the timer under management of the timer managing section 361 (step S3702). This predetermined time is set shorter as priority is higher.

Next, the network controller 703 of the mobile router 162 checks for whether or not received a connection-request confirmation message from another mobile router 162 (step S3703). In the case it is received, the mobile router 162 decides that the other mobile router 162 is higher in priority. The process returns to the step S3201, thus refraining from offering a communication service in this time.

In the case of not received a connection-request confirmation message from another mobile router 162, the timer managing section 361 checks for time lapse (step S3704). If the time is not elapsed, the process returns to the step S3703.

In the case the time has elapsed, the timer managing section 361 makes a notification to the connection control section 191. Thus, the connection control section 191 checks for communication quality of the external interface (step s3705). In the case of a decision as poor quality, the process returns to the step S3703, to wait for quality restoration.

Figure 26B:
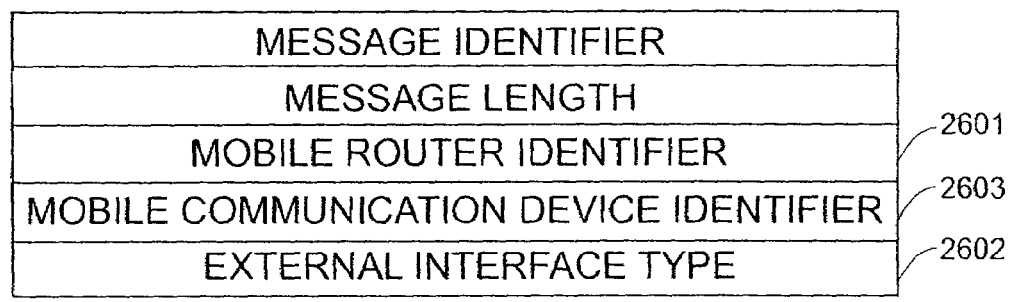
FIG. 26B is a figure showing a configuration of connection-request confirmation to be generated by the mobile router according to embodiment 5 of the invention.

The connection control section 191, when deciding the external interface as good quality, notifies it to the network controller 703. Thus, the network controller 703 generates a connection-request confirmation message as shown in FIG. 26 and multicasts it to another mobile routers and mobile communication devices (step S3706). In FIG. 26B, in the mobile communication device identifier 2603, set is an identification code of a mobile communication device the transmission is desired.

The network controller 203 of the mobile communication device 161 checks for reception of a connection-request confirmation message (step S3108). From then on, the process of up to a communication start step S3113 is the same as that of embodiment 4. Also, the mobile router 162 starts communication (step S3707).

Now explained is the operation of switchover of the interface of the mobile router for connection of the mobile communication device 161 to the external network 164, from mobile router (1) 162-1 to mobile router (2) 162-2.

Figure 23:
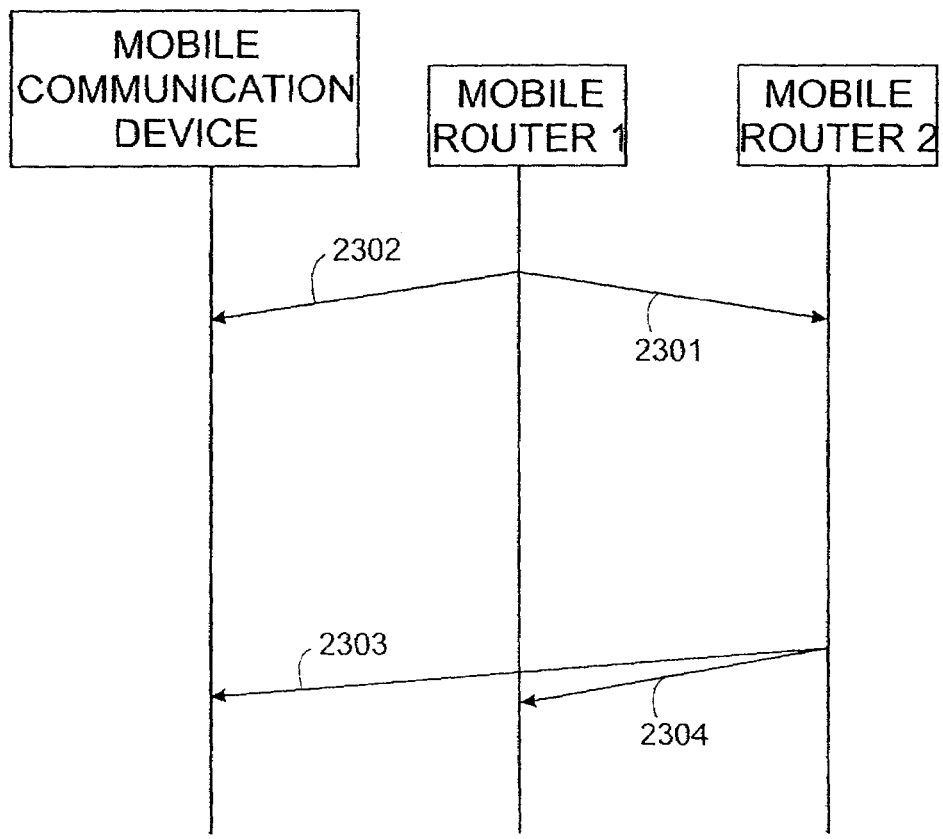
FIG. 23 is a sequence chart showing an operation to switch the external interface to be connected by the mobile communication device according to embodiment 4 of the invention.
Figure 38:
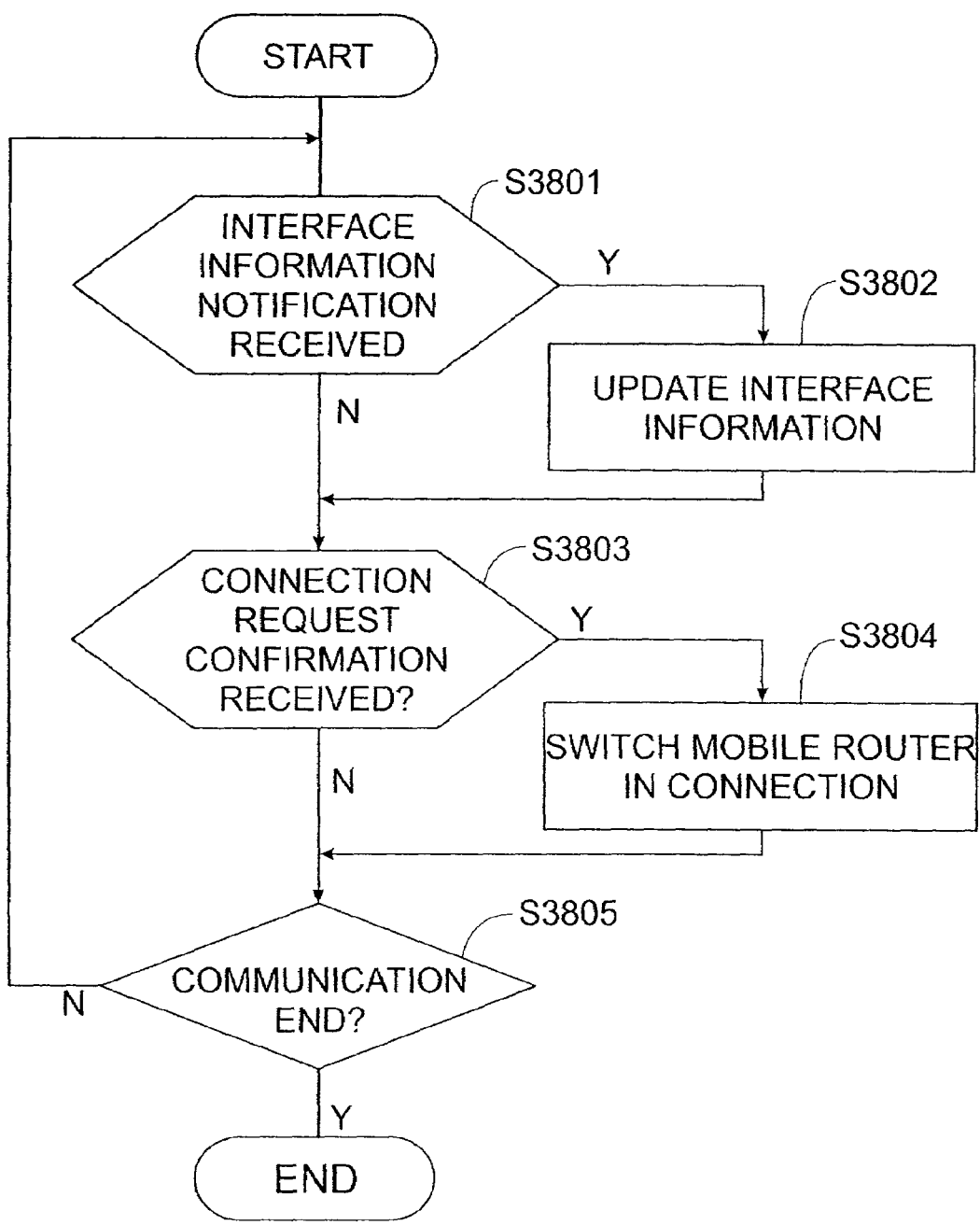
FIG. 38 is a flowchart showing an operation of the mobile communication device according to embodiment 5 of the invention.
Figure 39:
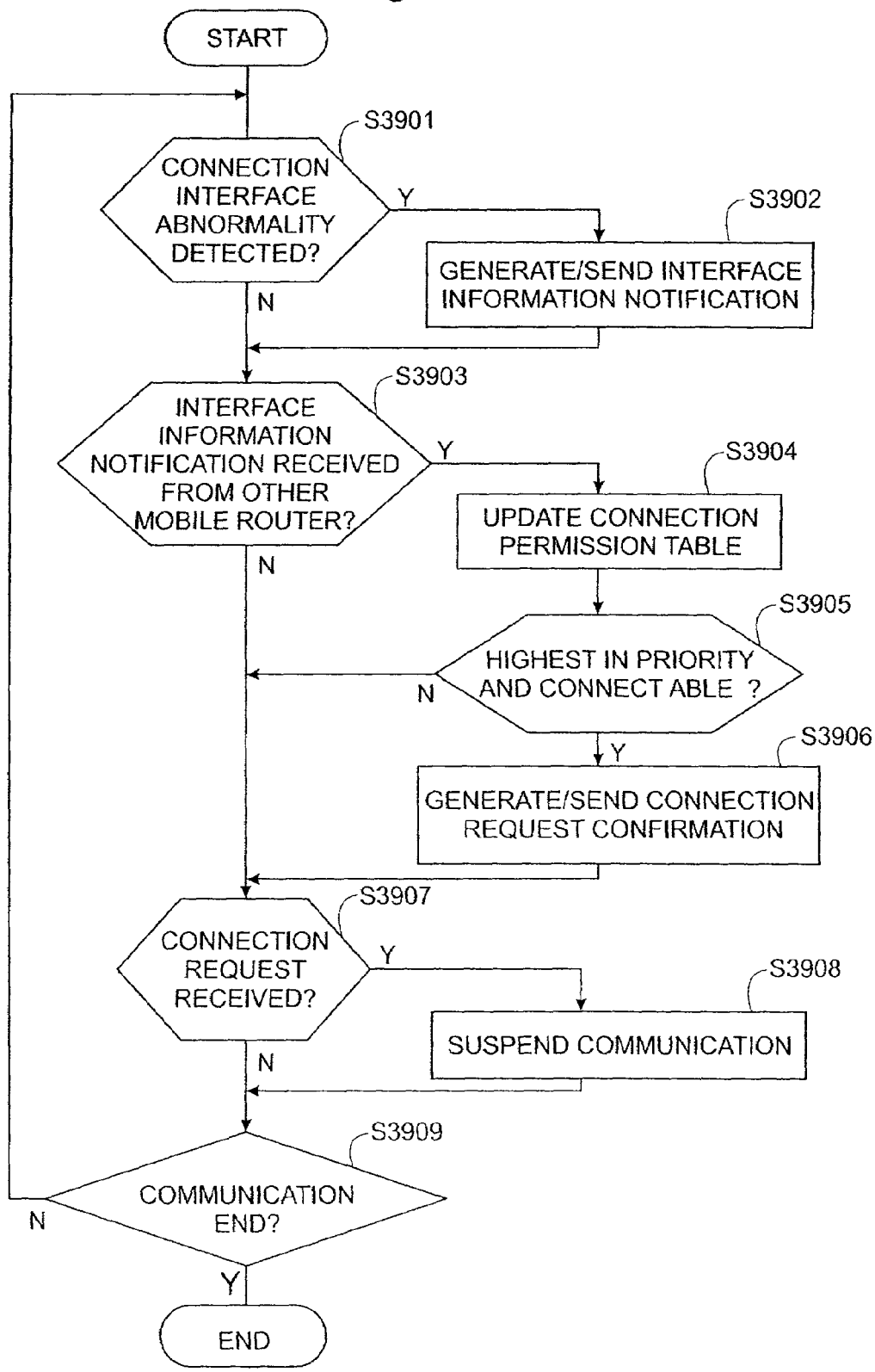
FIG. 39 is a flowchart showing an operation of the mobile router according to embodiment 5 of the invention.

FIG. 23 is a sequence showing this operation. FIG. 38 is a flowchart showing an operation of the mobile communication device while FIG. 39 is a flowchart showing an operation of the mobile router.

The external-link monitor section 192 of the mobile router (1) 162-1 currently in external connection, when detecting a change of external-link status (step S3901), prepares an interface-information notification message and multicasts 2301, 2302 it into the mobile communication system 165 (step S3202).

The network controller 203 of the mobile communication device 161, when receiving the interface-information notification message 2302 from another mobile router (step S3801), stores the interface type 2003, mobile router identifier 2002 and link status 2004 to the interface recording section 206 (step S3802).

Meanwhile, the mobile router (2), when receiving the interface-information notification message 2301 (step S3903), updates the pieces of information in the fields corresponding to the relevant mobile router identifier 2002 recorded in the connection permission table of the connection control section 191, i.e. interface type 2003 and link status 2004 (step S3904). Thereafter, the mobile router (2) 162 decides whether or not the identifier 2002 of the highest priority of mobile router 162 at the interface in connection status agrees with its own identifier and the external link is in connection status (step S3905). If the condition is satisfied, it regards itself as selected and generates a connection-request confirmation message 2303, 2304 and multicasts 2303, 2304 it into the mobile communication system 165 (step S3906).

At step S3903, in the case the network controller 203 does not receive an interface-information notification message from another mobile router, it checks for whether or not received a connection-request confirmation message 2304 (step S3907). The mobile router (1) 162-1, if receiving a connection-request confirmation message 2304 from the mobile router (2) 162-2, terminates the existing relaying with the mobile communication device 161. In the case of not received a connection-confirmation request, it is decided whether or not communication is over (step S3909). If not over, the process returns to the step S3901.

Meanwhile, if the network controller 203 of the mobile communication device 161 receives a connection-request confirmation message 2303 (step S3803), connection is established with the mobile router (2) 162-2 into communication (step S3805).

As described above, in the present embodiment, when the mobile communication device not having means for direct communication with an external network switches the mobile router during communication with an external network by way of the mobile router having an interface to the external network, the mobile router of before switchover multicasts a link-status change and informs it to other mobile routers. Thus, switchover is permitted when the mobile router decides, as itself, the highest priority of mobile router from the information of the relevant unit connection permission table. This can decide a connection interface from among the interface group optimal for service that is established at a start of communication. Meanwhile, it is possible to prevent communication with an interface not satisfying characteristics. Furthermore, it is possible to prevent against the fear that a third party gets information as concerned by switching of the interface, the fear to deteriorate the quality of communication data and the fear to interfere with communication of other mobile communication devices.

Meanwhile, in the present embodiment, when the mobile router detects an abnormality in an external interface in offering service, it is notified by multicast to other mobile routers. Switchover process of mobile routers can be made according to that information and the priority received of mobile routers. This eliminates the need of new communication between the mobile communication device and the mobile router, thus enabling to swiftly switch the mobile router. Also, congestion situation can be avoided on the network.

Incidentally, in this embodiment, the identifiers although described as IPv6 global addresses may satisfactorily specify the respective ones within the mobile communication system. Those may be IPv4 addresses, numbers arbitrarily assigned to mobile routers or mobile communication devices, or character strings.

Meanwhile, the matrix information, service types and significant parameters in the present embodiment are to be separately set by the user of the mobile communication device. However, these are not limitative but may be defined by downloading from a server for providing those pieces of information provided in the external network.

In the present embodiment, the interface for connection with a network although exemplified as IEEE802.11a, W-CDMA and PDC may be an interface that can be connected to the network, i.e. it may be a wireless interface such as of IEEE802.11b scheme, IEEE802.11e scheme, CDMA2000 scheme, HIPERLAN scheme, PHS scheme, Bluetooth scheme or UWB scheme or, besides, a wired scheme such as Ethernet (R), ADSL, IEEE1394, USB or ATM.

INDUSTRIAL APPLICABILITY

As described above, the present invention is useful for a mobile communication system that the mobile router is notified of and uses an external interface optimal for connection to a network according to the information to be handled by a mobile communication device, and suited for continuing communication by switching the external interface when there is caused a link status change in the external interface of the mobile router.

The invention claimed is:

1. A mobile communication device comprising:
   a service-type recording section for recording a service type of communication to be handled;
   an interface recording section for recording one or more types of external interfaces with an external network received from a first mobile router relayed to the external network;
   an interface decision section for selecting at least one of the external interfaces adapted for the service type;
   a transmission section for notifying first information of the at least one of the external interfaces selected to a second mobile router of or within a same segment
   a priority decision section for deciding a priority of the at least one of the external interfaces selected,
   wherein the transmission section generates second information, adds the first information with the priority and notifies the second information.

2. A mobile communication device according to claim 1, wherein the at least one of the external interfaces is a plurality of the external interfaces and the selecting of the at least one of the external interfaces is from the plurality of external interfaces of or within the first mobile router.

3. A mobile communication device according to claim 1, wherein
   the interface recording section further records link status information of the at least one of the external interfaces received, and
   the transmission section adds the second information with the link status information thereby generating a notification.

4. A mobile communication device according to claim 1, further having a collection timer managing section for managing a period to receive the one or more types of external interfaces from the mobile router,
   wherein the interface decision section selects an external interface after receiving a notification of elapse of a predetermined time from the collection timer managing section.

5. A mobile communication device comprising:
a service-type recording section for recording a service type of communication to be handled;
an interface recording section for recording one of more type of external interfaces with an external network received from a first mobile router relayed to the external network;
an interface decision section for selecting at least one of the external interfaces adapted for the service type: and
a transmission section for notifying first information of the at least one of the external interfaces selected to a second mobile router of or within a same segment, wherein
the service-type recording section records a plurality of significances of a plurality of parameters representative of a plurality of characteristics of the service type, and
the interface decision section decides the at least one of the external interfaces by weighting using the plurality of significances.

6. A mobile communication device according to claim 5, having a function for a user to change at least one of the service type or the significance.

7. A mobile communication device according to claim 5, wherein the service-type recording section has a function to record each of the significances by downloading from the external network.

8. A mobile communication device comprising:
a service-type recording section for recording a service type of communication to be handled;
an interface recording section for recording one of more types of external interfaces with an external network received from a first mobile router relayed to the external network;
an interface decision section for selecting at least one of the external interfaces adapted for the service type: and
a transmission section for notifying first information of the at least one of the external interfaces selected to a second mobile router of or within a same segment, wherein
the service-type recording section records a significance of a parameter representative of a characteristic of the service type, and
the interface decision section decides the at least one of the external interfaces based on the significance and takes a same parameter as the parameter of service type as a parameter representative of a characteristic of the at least one of the external interfaces, the parameters of the external interfaces each having further information recording superiority, the external interface being determined on a basis of the significance and the superiority.

9. A mobile communication device according to claim 8, wherein the service-type recording section has a function for a user to change at least one of the service type, the significance or the superiority.

10. A mobile communication device according to claim 8, wherein the service-type recording section has a function to record at least any one of the significance or the superiority by downloading from the external network.

11. A mobile router comprising:
an interface-type recording section for recording external-interface-type information as interface information for connection with an external network;
a connection-interface recording section for receiving and recording connection information for deciding an external interface for relaying with the external network, from a mobile communication device that received the external-interface-type information;
a connection decision section for deciding whether or not to relay communication from the mobile communication device, based on the connection information; and
a router transmission section for multicasting the external-interface-type information and providing a notification to the mobile communication device selected for the decision of relaying, wherein
the connection information has a plurality of external interface types, the connection decision section selecting one external interface associated with one of the plurality of external interface types, is added with a priority on each of the external interface types, and the connection decision section selects one of the plurality of the external interfaces according to the priority.

12. A mobile router according to claim 11, further comprising a timer managing section for managing a time up for a notification to relay by the connection decision section to the mobile communication device,
wherein the connection decision section provides the notification after a lapse of a time set shorter as the priority is increased.

13. A mobile router according to claim 11, wherein the connection decision section allows for relaying in a case that the selected external interface is in a connectable status and the priority is highest.

14. A mobile router according to claim 11, further comprising an external-link monitor section for notifying a change of link status to the mobile communication device and another mobile router through the router transmission section in a case that the selected external interface is changed in link status.

15. A mobile router according to claim 14, wherein the connection interface recording section updates information of connection status on a basis of a notification of link status change received from the other mobile router, and
the connection decision section allows for relaying in a case that the external interface is in a connectable status and the priority is highest from the updated information of connection status.

16. A mobile communication system comprising
a mobile communication device including:
a service-type recording section for recording a service type of communication to be handled;
an interface recording section for recording one or more type of an external interfaces to an external network received from a mobile router relaying to an external network;
an interface decision section for selecting at least one of the external interfaces adapted for the service type;
a transmission section for notifying first information of the at least one of external interfaces selected to the mobile router of or within a same segment; and
a mobile router including:
an interface-type recording section for recording external-interface-type information as interface information for connection with the external network;
a connection-interface recording section for receiving and recording connection information for deciding an external interface for relaying with the external network, from the mobile communication device that received the external-interface-type information;
a connection decision section for deciding whether or not to relay a communication from the mobile communication device, on the basis of the connection information; and a router transmission section for multicasting the external-interface-type information and making a notification to the mobile communication device selected for decision of relaying, wherein the service-type recording section records a plurality of significances of a plurality of parameters representative of a plurality of characteristics of the service type, and the interface decision section decides the at least one of the external interfaces by weighting using the plurality of significances.

17. A mobile communication system comprising a mobile communication device; and a mobile router, wherein the mobile communication device includes:
- a service-type recording section for recording a service type of communication to be handled,
- an interface recording section for recording one or more types of external interfaces to an external network received from the mobile router relaying to the external network,
- an interface decision section for selecting at least one of the external interfaces adapted for the service type, a transmission section for notifying first information of the at least one of the external interfaces selected to the mobile router of or within a same segment, and the mobile router includes:
- an interface-type recording section for recording external-interface-type information as interface information for connection with the external network;
- a connection-interface recording section for receiving and recording connection information for deciding an external interface for relaying with the external network, from the mobile communication device that received the external-interface-type information;
- a connection decision section for deciding whether or not to relay a communication from the mobile communication device, based on the connection information; and
- a router transmission section for multicasting the external-interface-type information and providing a notification to the mobile communication device selected for the decision of relaying, wherein the mobile router that the connection information is further added with a plurality of external interface types and a priority on each of the external interfaces, and the connection decision section is to select the external interface according to the priority, further comprises an external-link monitor section for notifying a change of link status to the mobile communication device and another mobile router through the router transmission section in a case the external interface is changed in link status; and the mobile communication device further comprises a priority decision section for deciding a priority of the external interface selected, the interface recording section recording link status information of the external interface further received, the transmission section adding the first information with the priority and the link status information thereby making a notification to the mobile router.

* * * * *

UNITED STATES PATENT AND TRADEMARK OFFICE
CERTIFICATE OF CORRECTION

PATENT NO. : 7,428,217 B2  Page 1 of 1
APPLICATION NO. : 10/511563
DATED : September 23, 2008
INVENTOR(S) : Kobayashi et al.

It is certified that error appears in the above-identified patent and that said Letters Patent is hereby corrected as shown below:

In column 25, line 5, in claim 5 "type of external" should read --types of external--.

Signed and Sealed this

Twenty-seventh Day of January, 2009

JOHN DOLL
*Acting Director of the United States Patent and Trademark Office*